US012638950B2

(12) United States Patent
Buerli et al.

(10) Patent No.: US 12,638,950 B2
(45) Date of Patent: May 26, 2026

(54) OBJECT PLACEMENT FOR ELECTRONIC DEVICES

(71) Applicant: Apple Inc., Cupertino, CA (US)

(72) Inventors: Michael E. Buerli, San Francisco, CA (US); Pavel V. Dudrenov, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 78 days.

(21) Appl. No.: 17/827,651

(22) Filed: May 27, 2022

(65) Prior Publication Data

US 2023/0040610 A1 Feb. 9, 2023

Related U.S. Application Data

(60) Provisional application No. 63/230,666, filed on Aug. 6, 2021.

(51) Int. Cl.
| | |
|---|---|
| G06F 3/04815 | (2022.01) |
| G06F 3/04842 | (2022.01) |
| G06F 3/04845 | (2022.01) |
| G06T 7/70 | (2017.01) |
| G06T 19/00 | (2011.01) |
| G06T 19/20 | (2011.01) |

(52) U.S. Cl.
CPC ...... *G06F 3/04815* (2013.01); *G06F 3/04842* (2013.01); *G06F 3/04845* (2013.01); *G06T 7/70* (2017.01); *G06T 19/006* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 8,022,967 B2 | 9/2011 | Okuno et al. | |
| 9,269,003 B2 | 2/2016 | Schmalstieg | |
| 10,019,962 B2 * | 7/2018 | Liu | G06F 3/011 |
| 10,186,087 B2 | 1/2019 | Davis et al. | |
| 2012/0249741 A1 * | 10/2012 | Maciocci | G06T 19/006 348/51 |
| 2013/0044128 A1 * | 2/2013 | Liu | G02B 27/017 345/633 |
| 2015/0241959 A1 * | 8/2015 | Abovitz | G06V 20/653 345/633 |
| 2018/0045963 A1 * | 2/2018 | Hoover | G02B 30/34 |

(Continued)

FOREIGN PATENT DOCUMENTS

| | | |
|---|---|---|
| EP | 3495926 A1 | 6/2019 |
| EP | 3896556 A1 | 10/2021 |

OTHER PUBLICATIONS

International Search Report and Written Opinion from PCT/US2022/038952, dated Nov. 16, 2022, 14 pages.

(Continued)

*Primary Examiner* — Linda Huynh
(74) *Attorney, Agent, or Firm* — BAKERHOSTETLER

(57) ABSTRACT

Aspects of the subject technology provide a real-time system for positioning and/or arranging application content anchored to locations in a physical environment. The subject technology may include a placement system that facilitates placement of application content relative to the anchors, according to application and/or system preferences and/or requirements for display of the content.

19 Claims, 14 Drawing Sheets

(56) References Cited

U.S. PATENT DOCUMENTS

| | | | | |
|---|---|---|---|---|
| 2018/0350099 | A1* | 12/2018 | Yerkes | G06T 19/006 |
| 2019/0065027 | A1* | 2/2019 | Hauenstein | G06F 3/04815 |
| 2019/0272674 | A1 | 9/2019 | Comer et al. | |
| 2019/0353904 | A1* | 11/2019 | Ardovino | G02B 27/0172 |
| 2020/0081530 | A1 | 3/2020 | Greenberg | |
| 2020/0111256 | A1* | 4/2020 | Bleyer | G06F 3/011 |
| 2021/0005021 | A1* | 1/2021 | Evertt | G06F 3/0481 |
| 2021/0019946 | A1* | 1/2021 | Sonasath | G06T 7/33 |
| 2021/0097775 | A1* | 4/2021 | Zurmoehle | G06F 1/1694 |
| 2021/0110562 | A1* | 4/2021 | Dunkley | G06T 7/60 |

OTHER PUBLICATIONS

Indian Patent Application No. 202417007290; Office Action dated Jun. 5, 2025, 8 pages.

* cited by examiner

Figure 5:
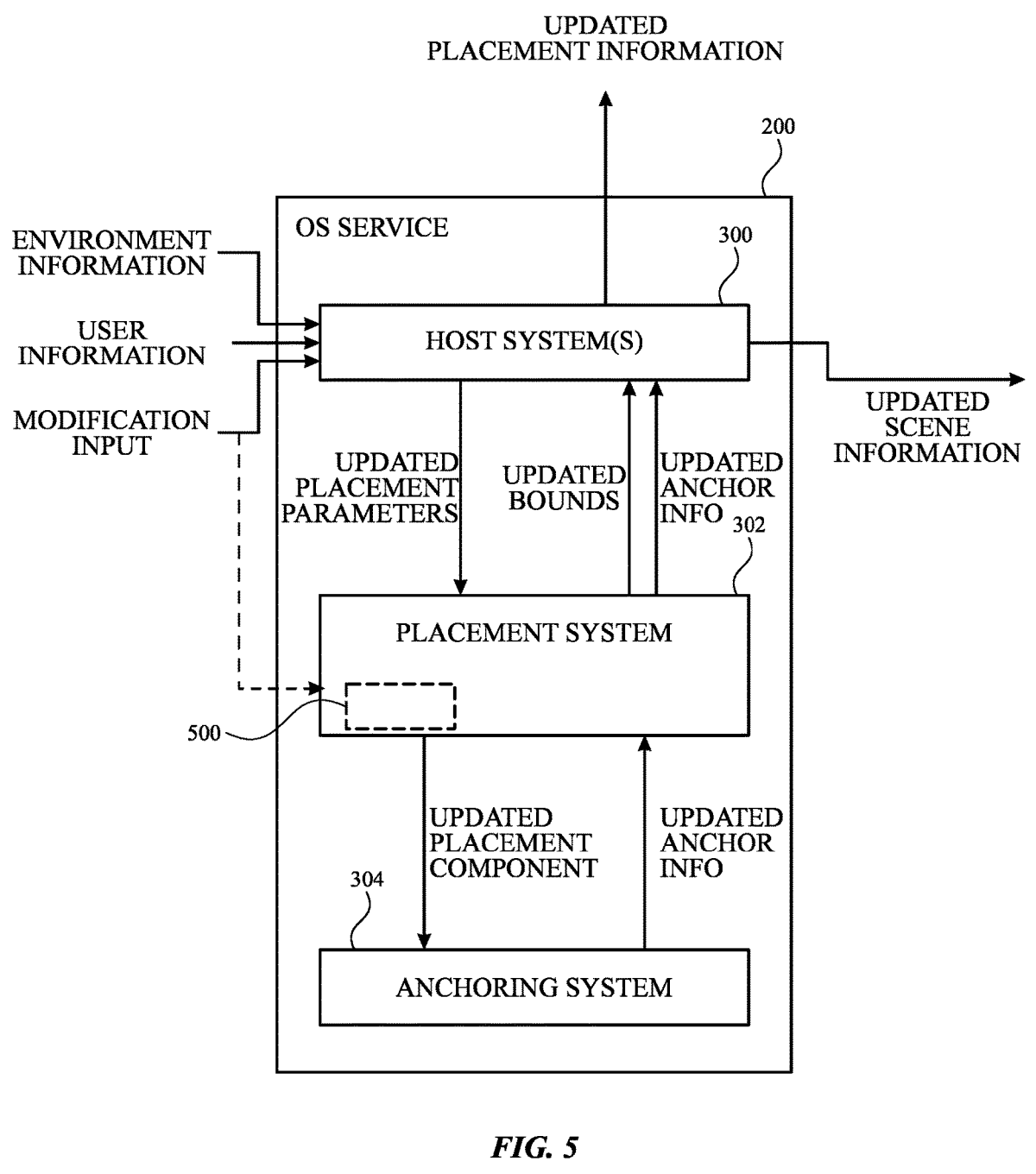

UPDATED
PLACEMENT INFORMATION

200

OS SERVICE

ENVIRONMENT
INFORMATION

USER
INFORMATION

MODIFICATION
INPUT

HOST SYSTEM(S)

300

UPDATED
SCENE
INFORMATION

UPDATED
PLACEMENT
PARAMETERS

UPDATED
BOUNDS

UPDATED
ANCHOR
INFO    302

PLACEMENT SYSTEM

500

UPDATED
PLACEMENT
COMPONENT

UPDATED
ANCHOR
INFO

304

ANCHORING SYSTEM

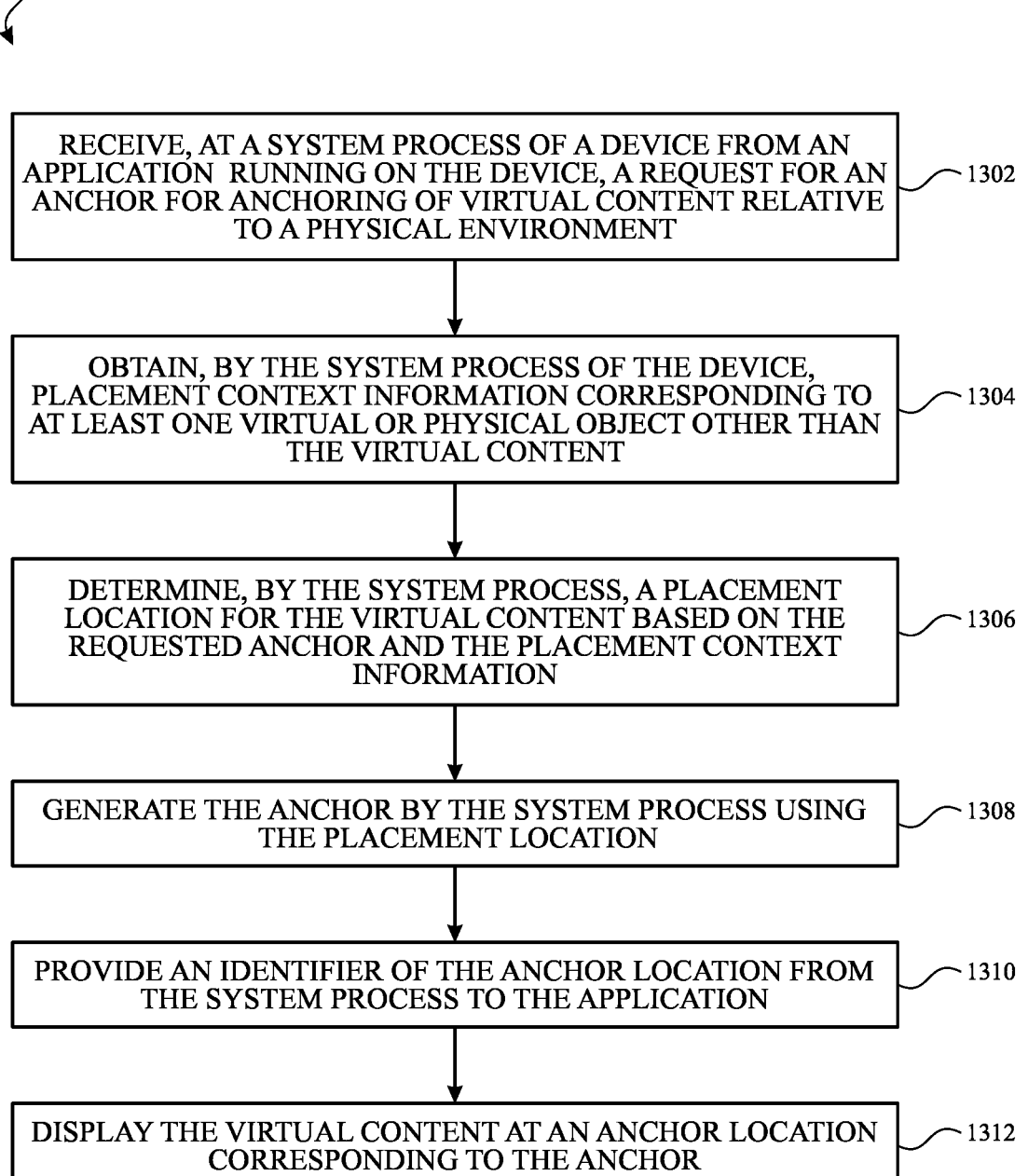

RECEIVE, AT A SYSTEM PROCESS OF A DEVICE FROM AN APPLICATION RUNNING ON THE DEVICE, A REQUEST FOR AN ANCHOR FOR ANCHORING OF VIRTUAL CONTENT RELATIVE TO A PHYSICAL ENVIRONMENT — 1302

OBTAIN, BY THE SYSTEM PROCESS OF THE DEVICE, PLACEMENT CONTEXT INFORMATION CORRESPONDING TO AT LEAST ONE VIRTUAL OR PHYSICAL OBJECT OTHER THAN THE VIRTUAL CONTENT — 1304

DETERMINE, BY THE SYSTEM PROCESS, A PLACEMENT LOCATION FOR THE VIRTUAL CONTENT BASED ON THE REQUESTED ANCHOR AND THE PLACEMENT CONTEXT INFORMATION — 1306

GENERATE THE ANCHOR BY THE SYSTEM PROCESS USING THE PLACEMENT LOCATION — 1308

PROVIDE AN IDENTIFIER OF THE ANCHOR LOCATION FROM THE SYSTEM PROCESS TO THE APPLICATION — 1310

DISPLAY THE VIRTUAL CONTENT AT AN ANCHOR LOCATION CORRESPONDING TO THE ANCHOR — 1312

*FIG. 13*

OBJECT PLACEMENT FOR ELECTRONIC DEVICES

CROSS REFERENCE TO RELATED APPLICATIONS

This application claims the benefit of priority to U.S. Provisional Patent Application No. 63/230,666, filed on Aug. 6, 2021, the disclosure of which is hereby incorporated herein in its entirety.

TECHNICAL FIELD

The present description relates generally to extended reality environments including, for example, object placement for electronic devices.

BACKGROUND

Extended reality technology aims to bridge a gap between virtual environments and a physical environment by providing an enhanced physical environment that is extended with electronic information. As a result, the electronic information appears to be part of the physical environment as perceived by a user. However, it can be challenging to determine where in the physical environment to place the electronic information.

BRIEF DESCRIPTION OF THE DRAWINGS

Certain features of the subject technology are set forth in the appended claims. However, for purpose of explanation, several implementations of the subject technology are set forth in the following figures.

FIG. 5 illustrates the example OS service of FIG. 3 updating an anchor responsive to user input in accordance with one or more implementations.

FIG. 13 illustrates a flow diagram of an example process for object placement according to aspects of the subject technology.

DETAILED DESCRIPTION

Figure 1:
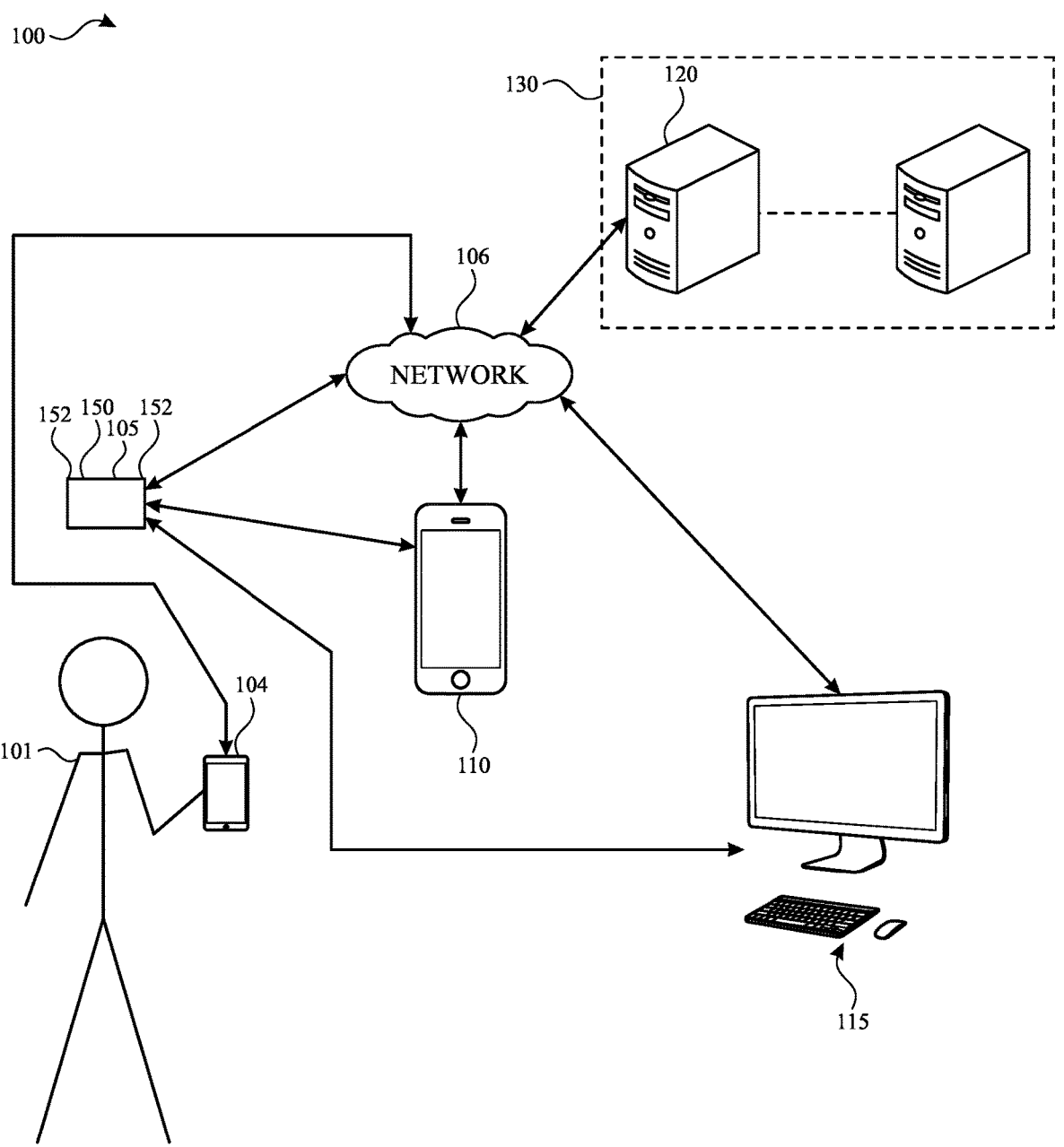
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or trans- lucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projec- tion-based systems may employ retinal projection technol- ogy that projects graphical images onto a person's retina. Projection systems also may be configured to project virtual objects into the physical environment, for example, as a hologram or on a physical surface.

Implementations of the subject technology described herein provide for coordinated and intuitive placement of virtual objects in an extended reality environment provided by an electronic device. Virtual content displayed in an extended reality environment can be anchored to an anchor location in a physical environment of the device, so that the displayed virtual content remains stationary relative to the physical environment as the user moves the device and/or looks around the XR environment. The anchor location can be requested by an application running at a device from a system process of the device.

In some circumstances, the requested anchor location is specific or explicit (e.g., an anchor corresponding to a compact physical object such as a user's hand, or an explicit location such as at the center of the user's field of view) and can be immediately provided by the system process. How- ever, in some circumstances, the requested anchor location can be an implicit anchor such as a region (e.g., a horizontal plane or a vertical plane) within which various placement locations are possible. In the case of an implicit anchor, placement context information can be obtained by a system process of a device, and used to determine where, in the region, to anchor and display the virtual content.

In one or more implementations, a placement system of a device provides additional placement input to an anchoring system of the device. As described in further detail herein- after, the placement system may facilitate coordinated and intuitive placement of virtual objects relative to each other and relative to physical objects in the extended reality environment. As described in further detail hereinafter, the placement context information can also help facilitate intui- tive and natural adjustments of the positions of displayed virtual objects as another virtual object is moved around or among the displayed virtual objects.

FIG. 1 illustrates an example system architecture 100 including various electronic devices that may implement the subject system in accordance with one or more implemen- tations. Not all of the depicted components may be used in all implementations, however, and one or more implemen- tations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, an electronic device 110, an electronic device 115, and a server 120. For explanatory purposes, the system archi- tecture 100 is illustrated in FIG. 1 as including the electronic device 105, the electronic device 110, the electronic device 115, and the server 120; however, the system architecture 100 may include any number of electronic devices and any number of servers or a data center including multiple servers.

The electronic device 105 may be smart phone, a tablet device, or a wearable device such as a head mountable portable system, that includes a display system capable of presenting a visualization of an extended reality environ- ment to a user 101. The electronic device 105 may be powered with a battery and/or any other power supply. In an example, the display system of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access an extended reality environ- ment, the user may use an electronic device 104, such as a tablet, watch, mobile device, and the like.

The electronic device 105 may include one or more cameras such as camera(s) 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, tem- perature sensors, Lidar sensors, radar sensors, sonar sensors, GPS sensors, Wi-Fi sensors, near-field communications sen- sors, etc.) Moreover, the electronic device 105 may include hardware elements that can receive user input such as hardware buttons or switches. User input detected by such sensors and/or hardware elements correspond to various input modalities for interacting with virtual content dis- played within a given extended reality environment. For example, such input modalities may include, but not limited to, facial tracking, eye tracking (e.g., gaze direction), hand tracking, gesture tracking, biometric readings (e.g., heart rate, pulse, pupil dilation, breath, temperature, electroen- cephalogram, olfactory), recognizing speech or audio (e.g., particular hotwords), and activating buttons or switches, etc. The electronic device 105 may also detect and/or classify physical objects in the physical environment of the elec- tronic device 105.

The electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power limitations of the electronic device 105 such as available battery power of the device. In response to power limita- tions, the electronic device 105 may deactivate certain sensors within the device itself to preserve battery power.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the extended reality environment in a real-time manner. In an example, the electronic device 105 provides a rendering of a scene corresponding to the extended reality environment that can be perceived by the user and interacted with in a real-time manner. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The electronic device 105 may also detect events that have occurred within the scene of the extended reality environment. Examples of such events include detecting a presence of a particular person, entity, or object in the scene. Detected physical objects may be classified by electronic device 105, electronic device 110, and/or electronic device 115 and the location, position, size, dimensions, shape, and/or other characteristics of the physical objects can be used to provide physical anchor objects for an XR application generating virtual content, such as a UI of an application, for display within the XR environment.

It is further appreciated that the electronic device 110 and/or the electronic device 115 can also generate such extended reality environments either working in conjunction with the electronic device 105 or independently of the electronic device 105.

The network 106 may communicatively (directly or indirectly) couple, for example, the electronic device 105, the electronic device 110 and/or the electronic device 115 with the server 120 and/or one or more electronic devices of one or more other users. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a mobile smartphone device with a touchscreen. In one or more implementations, the electronic device 110, the electronic device 104, and/or the electronic device 105 may be, and/or may include all or part of, the electronic system discussed below with respect to FIG. 14. In one or more implementations, the electronic device 110 may be another device such as an Internet Protocol (IP) camera, a tablet, or a peripheral device such as an electronic stylus, etc.

The electronic device 115 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 14.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120.

Figure 2:
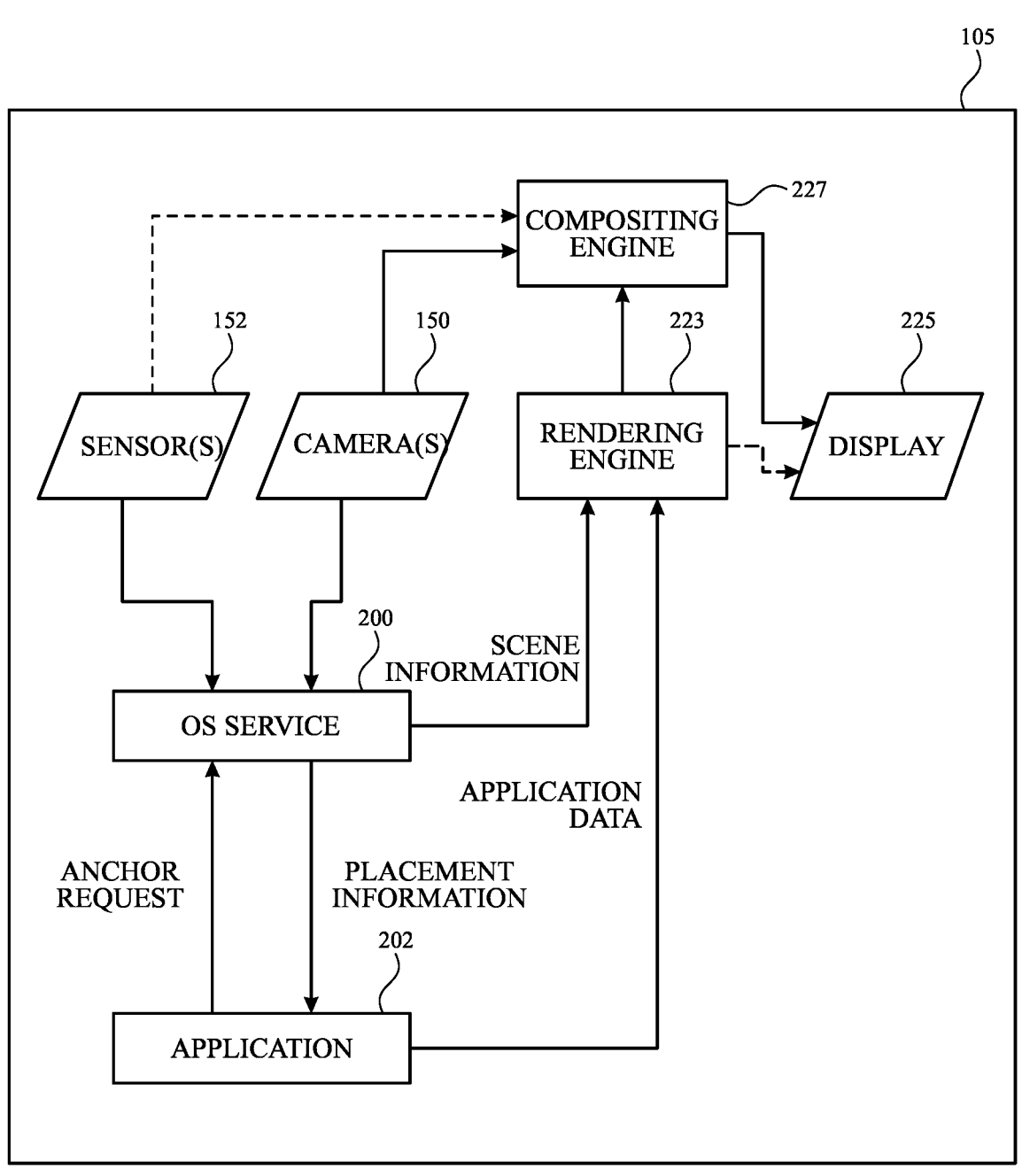
FIG. 2 illustrates an example computing device that may implement aspects of the subject technology.

FIG. 2 illustrates an example architecture that may be implemented by the electronic device 105 in accordance with one or more implementations of the subject technology. For explanatory purposes, portions of the architecture of FIG. 2 are described as being implemented by the electronic device 105 of FIG. 1, such as by a processor and/or memory of the electronic device; however, appropriate portions of the architecture may be implemented by any other electronic device, including the electronic device 110, electronic device 115, and/or server 120. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of the architecture of FIG. 2 can be implemented in software or hardware, including by one or more processors and a memory device containing instructions, which when executed by the processor cause the processor to perform the operations described herein. For example, in FIG. 2, the trapezoidal boxes may indicate that the sensors 152, the camera(s) 150 and the display 225 may be hardware components, and the rectangular boxes may indicate that the OS service 200, the application 202, the rendering engine 223, and the compositing engine 227 may be implemented in software, including by one or more processors and a memory device containing instructions, which when executed by the processor cause the processor to perform the operations described herein.

In the example of FIG. 2, an application such as application 202 provides application data to a rendering engine 223 for rendering of the application data, such as a UI of the application or other virtual content. The application data may include application-generated content (e.g., windows, buttons, tools, etc.) and/or user-generated content (e.g., text, images, etc.), and information for rendering the content in the UI. In one or more implementations, rendering engine 223 renders the UI for display by a display such as display 225 of the electronic device 105.

As shown in FIG. 2, additional information may be provided for display of the UI of the application 202, such as in a two-dimensional or three-dimensional (e.g., XR) scene. In the example of FIG. 2, sensors 152 provide environment information (e.g., depth information from one or more depth sensors, motion information from one or more motion sensors, and/or user information) to an OS service 200 (e.g., an XR service that may be provided by an operating system of the electronic device 105). Camera(s) 150 may also provide images of a physical environment and/or one or more portions of the user (e.g., the user's eyes, hands, face, etc.) to OS service 200. OS service 200 may generate scene information, such as three-dimensional map, of some or all of the physical environment of electronic device 105 using the environment information (e.g., the depth information and/or the images) from sensors 152 and camera(s) 150.

As illustrated in FIG. 2, application 202 may request an anchor from the OS service 200, such as in an anchor request. Application 202 may be a gaming application, a media player application, a content-editor application, a training application, a simulator application, or generally any application that provides a UI or other content for display at a location that depends on the physical environment, such as by anchoring the UI or other content to an anchor in the physical environment.

In some use cases, the anchor request may include a request for an implicit anchor (e.g., a general physical object such as a horizontal planar surface, a surface of a floor, or a surface of a tabletop, a vertical planar surface, or a surface of a wall). In some use cases, the anchor request may include a request for an explicit anchor, such as a specific physical object (e.g., a hand of a user or another participant, a face of a user or another participant, a head of a user or another participant, or a body of a user or another participant), a user-defined location (e.g., defined by a gesture to or at the location by the user), or a camera-centric location (e.g., a location at the center of the user's field of view).

As indicated in FIG. 2, responsive to an anchor request, the OS service 200 may return placement information to the application 202. In one or more implementations, the placement information may include an identifier of an anchor generated by the OS service 200 responsive to the anchor request. In one or more implementations, the placement information may also include bounds (e.g., two-dimensional boundary information) that indicate the boundaries beyond which application data generated by the application 202 may be clipped if provided for display. In one or more implementations, the placement information can include the anchor identifier, but not the anchor itself (e.g., not the location of the anchor or a transform from a coordinate origin to the location of the anchor). In one or more implementations, the anchoring of the application data may be performed, using the generated anchor, by the OS service 200 and/or by the rendering engine 223.

Application 202 may include code that, when executed by one or more processors of electronic device 105, generates application data, for display of a UI or other virtual content of the application on, near, attached to, or otherwise associated with an anchor location corresponding to the anchor identified by the identifier provided from OS service 200.

Once the application data has been generated, the application data can be provided to the OS service 200 and/or the rendering engine 223, as illustrated in FIG. 2. As shown, scene information can also be provided to rendering engine 223. The scene information can include or be based on, as examples, environment information such as a depth map of the physical environment, and/or object information for detected objects in the physical environment. Rendering engine 223 can then render the application data from application 202 for display by display 225 of electronic device 105 at an anchor location corresponding to the anchor generated responsive to the anchor request. The UI or other virtual content of application 202 is rendered for display at the appropriate location on the display 225, to appear in association with the anchor provided by OS service 200. Display 225 may be, for example, an opaque display, and camera(s) 150 may be configured to provide a pass-through video feed to the opaque display. The UI or other virtual content may be rendered for display at a location on the display corresponding to the displayed location of a physical anchor object in the pass-through video. Display 225 may be, as another example, a transparent or translucent display. The UI or other virtual content may be rendered for display at a location on the display corresponding to a direct view, through the transparent or translucent display, of the physical anchor object.

As shown, electronic device 105 can also include a compositing engine 227 that composites video images of the physical environment, based on images from camera(s) 150, for display together with the rendered UI or other virtual content from rendering engine 223. For example, compositing engine 227 may be provided in an electronic device 105 that includes an opaque display, to provide pass-through video to the display. In an electronic device 105 that is implemented with a transparent or translucent display that allows the user to directly view the physical environment, compositing engine 227 may be omitted or unused in some circumstances, or may be incorporated in rendering engine 223. Although the example of FIG. 2 illustrates a rendering engine 223 that is separate from OS service 200, it should be appreciated that OS service 200 and rendering engine 223 may form a common service and/or that rendering operations for rendering content for display can be performed by the OS service 200. Although the example of FIG. 2 illustrates a rendering engine 223 that is separate from application 202, it should be appreciated that, in some implementations, application 202 may render content for display by display 225 without using a separate rendering engine.

Electronic device 105 may allow application 202 to request and obtain anchor information from OS service 200 (e.g., via an application programming interface (API) or via a Serial Peripheral Interface (SPI)) as illustrated in FIG. 2, which can facilitate efficient development, implementation, and/or run-time execution of application 202 (e.g., since each application 202 does not have to perform its own object detection, scene mapping, anchoring, tracking, etc.) as well as intuitive placement and/or behavior of virtual objects in the XR environment.

Figure 3:
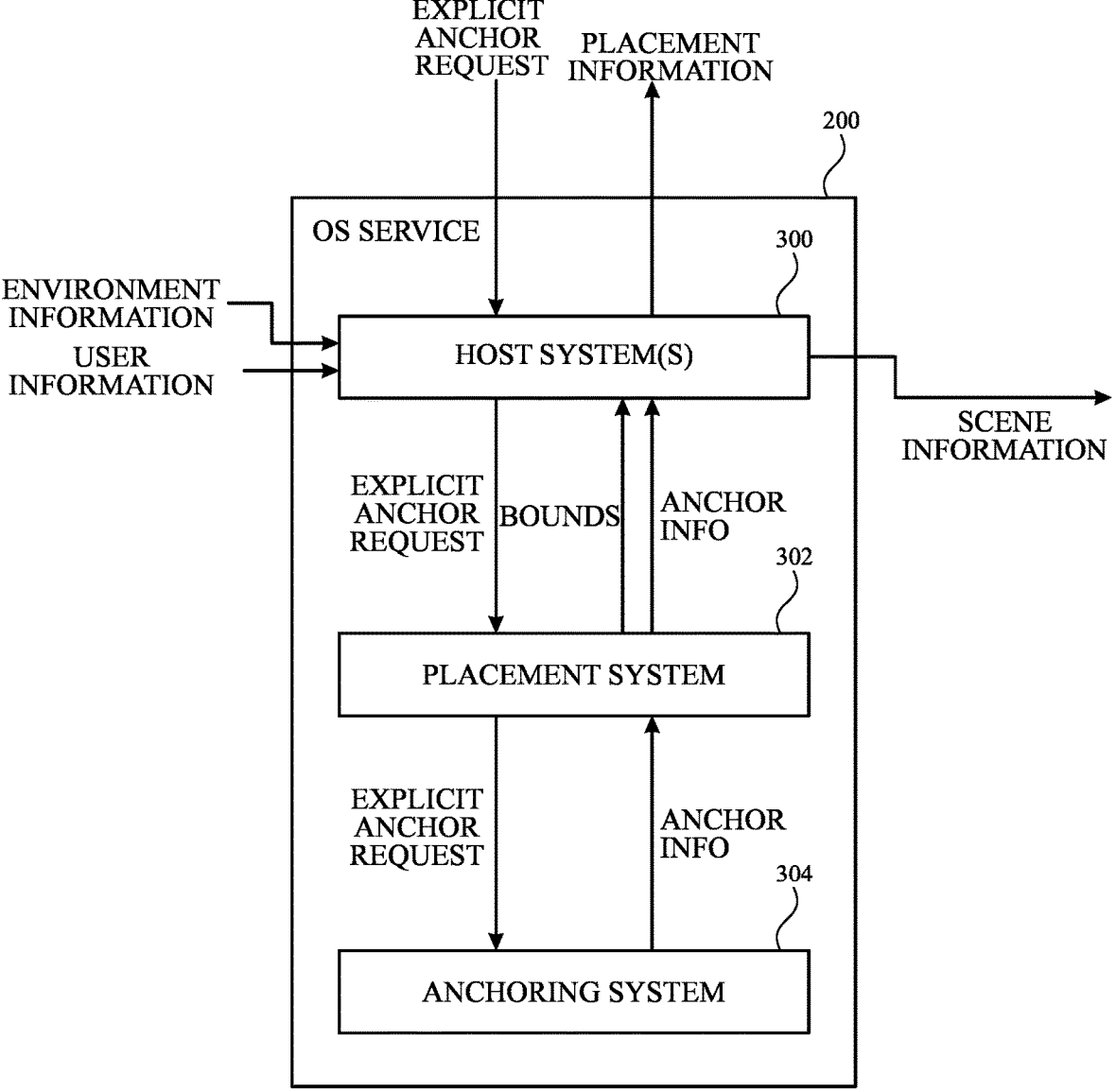
FIG. 3 illustrates an example operating system (OS) service of an electronic device in accordance with one or more implementations.
Figure 4:
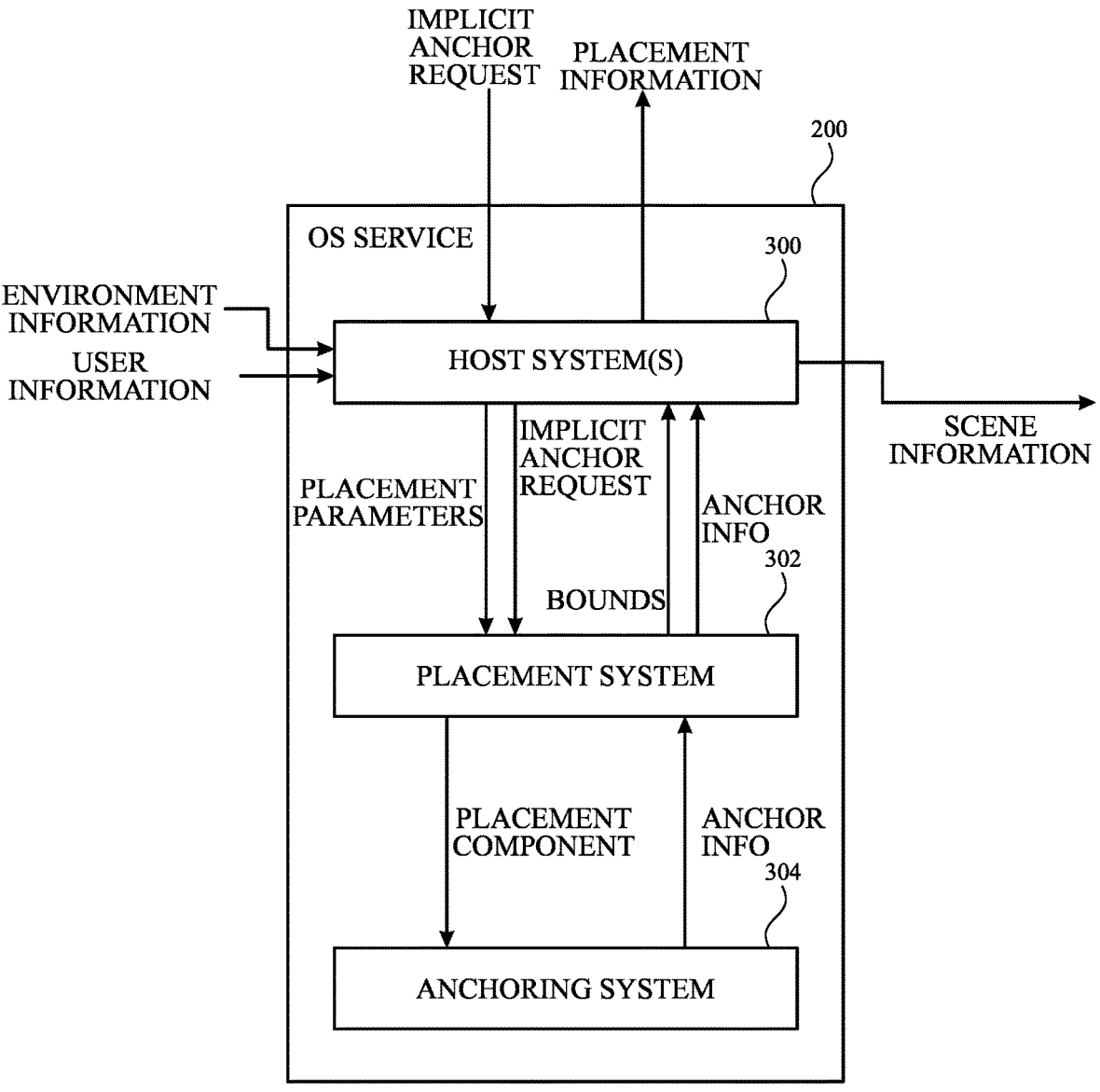
FIG. 4 illustrates the example OS service of FIG. 3 generating an anchor responsive to an implicit anchor request in accordance with one or more implementations.

As described herein, in various use cases, the application 202 may request an explicit anchor or an implicit anchor from the OS service 200. FIGS. 3 and 4 illustrate example operations of the OS service 200 that may be performed for generating an explicit anchor and an implicit anchor, respectively.

As shown in the example of FIG. 3, in one or more implementations, the OS service 200 may include one or more host systems 300, a placement system 302, and an anchoring system 304. In the example of FIG. 3, the host systems 300 receive an explicit anchor request (e.g., from the application 202). As shown, the host systems 300 may also receive environment information and/or user information (e.g., from camera(s) 150 and/or sensors 152).

For example, the environment information may include a map (e.g., a depth map) of a physical environment of the electronic device 105 or another representation of the physical environment of the electronic device 105 and/or the locations, sizes, and/or other features of one or more objects in the physical environment. For example, the user information may include a location of the user in the physical environment (e.g., a location relative to particular object or location in the physical environment, such as an initial location of the user or the device or a coordinate origin established when the device was powered on or established during an enrollment operation in the physical environment and/or based on a mapping of the physical environment), an orientation of the user (e.g., an orientation of the user's body and/or the user's head), a gaze location corresponding to the location at which the user's gaze is currently focused), user motion information, user gesture information, etc.

In the example of FIG. 3, because the anchor request is an explicit anchor request for an explicit anchor location, the explicit anchor request can be passed to the anchoring system 304 (e.g., via the placement system 302 as in the example of FIG. 3, or directly from the host systems 300), and the anchoring system 304 can generate the anchor at the explicit anchor location and provide anchor information responsive to the explicit anchor request. For example, if the explicit anchor request is a request for an anchor corresponding to a user-defined location in the physical environment (e.g., in a case in which the user performs a gesture dropping the virtual content at the user-defined location), the anchoring system 304 may generate the anchor by determining a transform between a coordinate origin and the user-defined location. The anchoring system 304 may also generate an identifier for the generated anchor.

In the example of FIG. 3, the anchoring system 304 returns anchor information to the host systems 300 (e.g., via the placement system 302 as in the example of FIG. 3, or directly). For example, the anchor information may include the identifier and the transform. As shown, the host systems 300 may, responsive to receiving the anchor information from the anchoring system 304, provide placement information to the application 202. For example, the placement information may include the identifier of the generated anchor (e.g., without including the location or the transform for the anchor). As indicated in FIG. 3, the placement system 302 may provide additional information to the host systems 300, in one or more implementations. For example, the placement system 302 may determine (e.g., based on placement context information such as information indicating occupancy of virtual and/or physical objects in the XR environment and/or based on application and/or system display preferences for the virtual content) bounds around the anchor location within which application content can be displayed, and may return the bound information to the host systems 300. In one or more implementations, the bound information may be included in the placement information that is provided to the application 202 from the host systems 300.

In one or more implementations, some or all of the anchor information may be provided to the rendering engine 223 in the scene information from the host systems 300, or the anchor information can be handled by the host systems 300 to determine a location for rendering the application data, and the scene information can include an indication of the location for rendering the application data. In one or more implementations, the scene information may include additional information such as some or all of the environment information and/or the user information, and/or scene rendering instructions based on the environment information and/or the user information. The rendering engine 223 may then render application data (e.g., application data corresponding to a UI or other virtual content generated by the application) and/or other virtual content, for display in an XR environment, based on the scene information from the host systems 300. In another implementation, the application data for rendering at the anchor location may be provided to the host systems 300 and rendered at the anchor location by the host systems 300.

In contrast with FIG. 3, FIG. 4 illustrates a scenario in which the OS service 200 receives an implicit anchor request. An implicit anchor request may be a request for an anchor that includes some ambiguity with respect to the specific anchor location. For example, an implicit anchor request may be a request for a region (e.g., a request for a horizontal plane, a request for a vertical plane, a request for a floor, or a request for a wall), in which the location within the region is not specified in the request.

In the example of FIG. 4, when an implicit anchor request is received by the host systems 300, the host systems 300 may provide the implicit anchor request along with one or more placement parameters to the placement system 302. As examples, the placement parameters may include placement context information such as occupancy information for other virtual content in the XR environment, occupancy information for physical objects in the physical environment, available region information indicating one or more available portions of the physical environment (e.g., an unoccupied portion of a wall or an unoccupied portion of a floor or a desk) in which the virtual content can be placed, and/or one or more placement preferences such as preferences to be placed to the left of, to the right of, above, or below an existing virtual or physical object, a preference to be placed as child object of an existing virtual or physical object, a preference to be oriented to a primary user, a preference to respond or not respond to another participant in a shared XR experience, a preference to be oriented toward multiple users (e.g., toward an intermediate location between a user of the electronic device and another participant in a shared XR experience), an intended viewing distance, and/or bounds within which the virtual content can be displayed.

In one or more implementations, the placement system 302 may determine, based on the implicit anchor request and the placement parameters, a placement component. For example, the placement system 302 may identify a region in the physical environment within which space is available for display of the virtual content, and select a placement location within that region based on display preferences for the virtual content and/or based on display preferences of other virtual content already displayed. The placement component may be or include the placement location, and may be provided to the anchoring system 304 to indicate, to the anchoring system 304, the placement location at which to generate the anchor. In one or more other implementations, the placement system 302 may include, in the placement component, instructions to the anchoring system 304 for selecting the location at which to generate the anchor.

In one or more implementations, the placement system 302 may obtain initial anchor information from the anchoring system 304 prior to generation of the placement component. For example, in one or more implementations, the placement system 302 may obtain an anchor location of a physical anchor object (e.g., an anchor location of a floor, a wall, a desk, a table, etc.) or a virtual anchor object (e.g., a floating vertical plane or a floating horizontal plane) that corresponds to the implicit anchor (e.g., at a center, edge, corner, or other position on the implicit anchor), determine a placement location different than the anchor location of the physical or virtual anchor object, determine a relative transform between the placement location and the anchor location of the physical or virtual anchor object, and provide the relative transform to the anchoring system (e.g., as the placement component). In this example, the anchoring system 304 may determine an anchor transform between a coordinate origin and the placement location, by combining the relative transform received from the placement system 302 with a transform between the coordinate origin and the anchor location of the physical or virtual anchor object. In this example, the anchoring system 304 may provide the anchor transform and an identifier of the anchor transform to the placement system 302 (e.g., as anchor information for the generated anchor).

As shown in FIG. 4, the placement system 302 may also generate bounds (e.g., and/or other information such as orientation information for the virtual content) corresponding to the anchor that generated responsive to the implicit anchor request, and can provide the bounds (e.g., and/or other information such as orientation information for the virtual content) to host systems 300 along with the anchor information generated by the anchoring system 304. As in the example of FIG. 3, the host systems 300 may then provide placement information (e.g., including the anchor identifier and the bound information or other placement information) to the application 202, and provide scene information to the rendering engine 223.

In one or more implementations, anchors generated by the OS service 200 can be dynamically updated in a way that provides intuitive interaction with virtual content by a user of the electronic device. For example, FIG. 5 illustrates operations that may be performed by the OS service 200 when a modification input is received from a user. As examples, modification inputs may be user movements within an XR environment (e.g., translational and/or rotational movements of the user's body, reorientations of the user's head, and/or eye movements), user interaction with displayed virtual content (e.g., user gestures such as gestures to grab, push, pull, rotate, and/or otherwise move displayed virtual content), user inputs to add new virtual content to an XR environment, an addition or motion of another participant in a shared XR experience, or other inputs for modifying any aspect of the XR environment.

As shown in FIG. 5, the modification input may be provided to the host systems 300. The host systems 300 may generate updated placement parameters and provide the updated placement parameters to the placement system 302. As shown, the placement system 302 may generate an updated placement component (e.g., including an updated placement location) based on the updated placement parameters, and provide the updated placement component to the anchoring system 304. As shown, the anchoring system 304 may then generate updated anchor information (e.g., an updated transform corresponding to the updated placement location indicated by the updated placement component for an existing anchor identifier, or a new transform corresponding to a new placement location indicated by the updated placement component for a new existing anchor identifier), and provide the updated anchor information to the placement system 302.

As shown, the placement system 302 may then provide the updated anchor information and/or updated bounds generated by the placement system 302, to the host systems 300. The host systems 300 may provide updated placement information (e.g., based on the updated anchor information and/or the updated bounds) to the application 202, and updated scene information to the rendering engine 223. In one or more implementations, the placement information provided to the application may remain unchanged (e.g., if a new anchor location is generated by the anchoring system 304 for an existing identifier). In this way, the system can provide efficient updating of locations of displayed virtual content, without using application processing for the update operations. As indicated in FIG. 5, in one or more implementations, the modification input can be provided directly to the placement system 302 and the placement system 302 can generate the updated placement component without receiving any updated placement parameters (e.g., the placement parameters may be unchanged by the modification input in some implementations). As shown in FIG. 5, in one or more implementations, the placement system 302 may store one or more workspaces, such as workspace 500, during some or all of a modification operation for virtual content (e.g., to allow the placement system 302 to snap the virtual content back to a previous anchor location if the modification operation is terminated before a new placement location is determined for the virtual content). Examples of modification inputs, and resulting operations of the placement system 302 and/or the anchoring system 304, are described hereinafter in connection with, for example, FIGS. 9-12.

Figure 6:
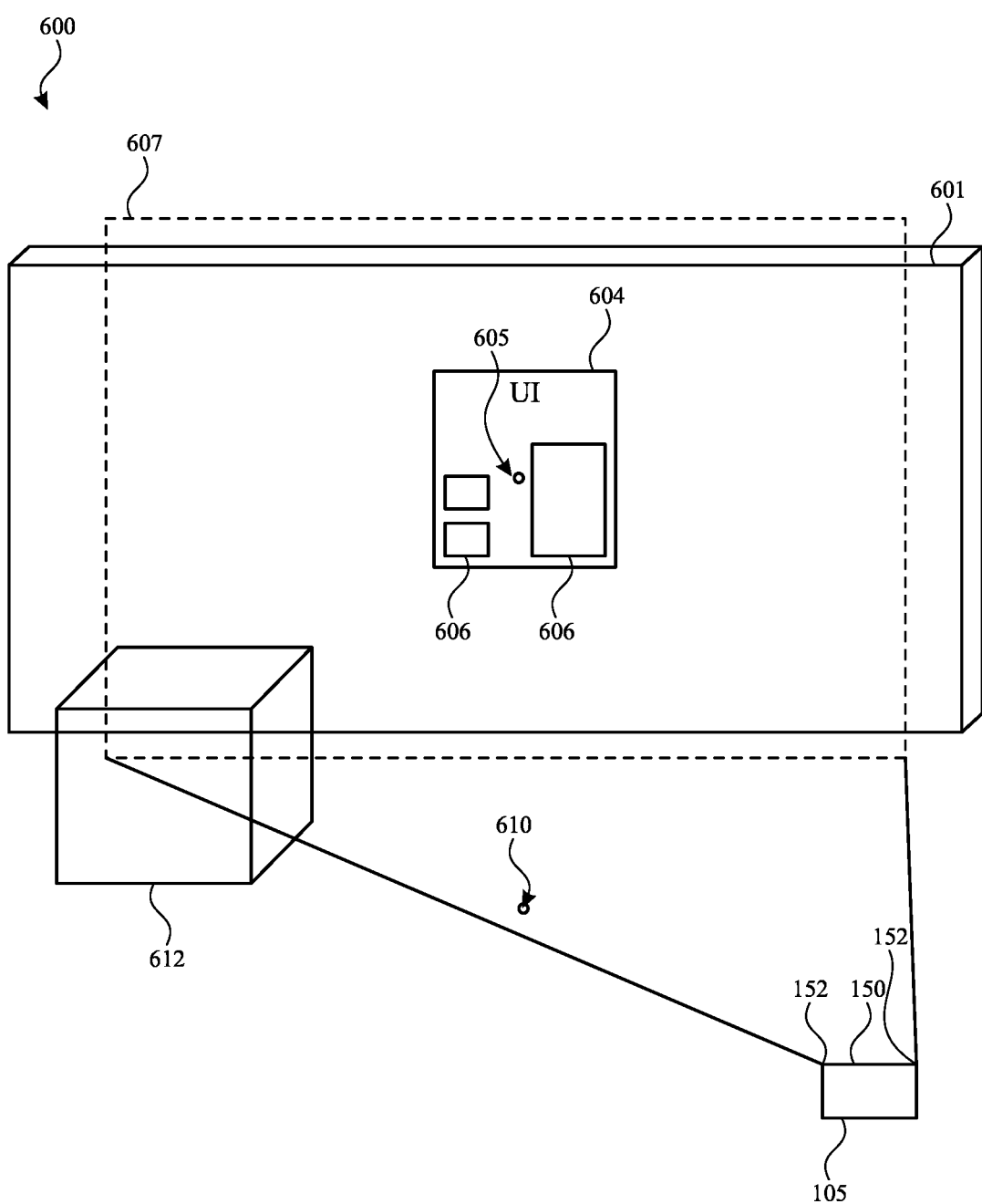
FIG. 6 illustrates an example of virtual content anchored to an explicit anchor in accordance with aspects of the subject technology.

FIG. 6 illustrates an example in which the electronic device 105 displays virtual content at an explicit anchor location in an XR environment. For example, in one or more implementations, electronic device 105 display may a user interface (UI) of an application, such as application 202, running on the device, at an anchor location in a physical environment of the electronic device. FIG. 6 illustrates an example in which a user interface window 604 (e.g., of application 202) is displayed by electronic device 105 to appear to be located at an anchor location 605 in an environment such as physical environment 600 of the electronic device 105. In the example of FIG. 6, UI window 604 which may include one or more elements 606. Elements 606 may include text entry fields, buttons, selectable tools, scrollbars, menus, drop-down menus, links, plugins, image viewers, media players, sliders, or the like.

In the example of FIG. 6, UI window 604 is displayed in the viewable area 607 of the display of the electronic device 105 to appear, in an extended reality environment of electronic device 105, as if attached to a physical wall 601 in the physical environment 600. In this example, a physical table 612 is also present in the physical environment 600. In the example of FIG. 6, the display of the UI window 604 to appear as though on the physical wall 601 can be achieved, in part, by receiving an explicit user-identification of the anchor location 605, and generating (e.g., by anchoring system 304) a transform between a coordinate origin 610 and the anchor location 605. In this way, if electronic device 105 is moved within the physical environment 600, the displayed UI window 604 appears to remain at the anchor location 605 on physical wall 601.

However, in some scenarios, rather than receiving an explicit user-defined location for the anchor location 605, an application (e.g., application 202) may request an implicit anchor, such as a vertical plane or a vertical wall. Responsive to the request for anchoring of the UI window 604 to a vertical plane or a vertical wall, the electronic device 105 may identify (e.g., using sensors 152 and/or camera(s) 150) the physical wall 601, determine (e.g., using anchoring system 304) an anchor location 701 corresponding to the physical wall 601 (e.g., and determining a transform between the coordinate origin 610 and the anchor location 701), determine (e.g., by the placement system 302 based on placement context information) a placement location 700 for the UI window 604, determine a relative transform between the anchor location 701 and the placement location 700, and generate an anchor having an anchor location at the placement location 700 (e.g., by generating a transform between the coordinate origin 610 and the placement location 700 by combining the transform between the coordinate origin 610 and the anchor location 701 with the relative transform between the anchor location 701 and the placement location 700).

Figure 7:
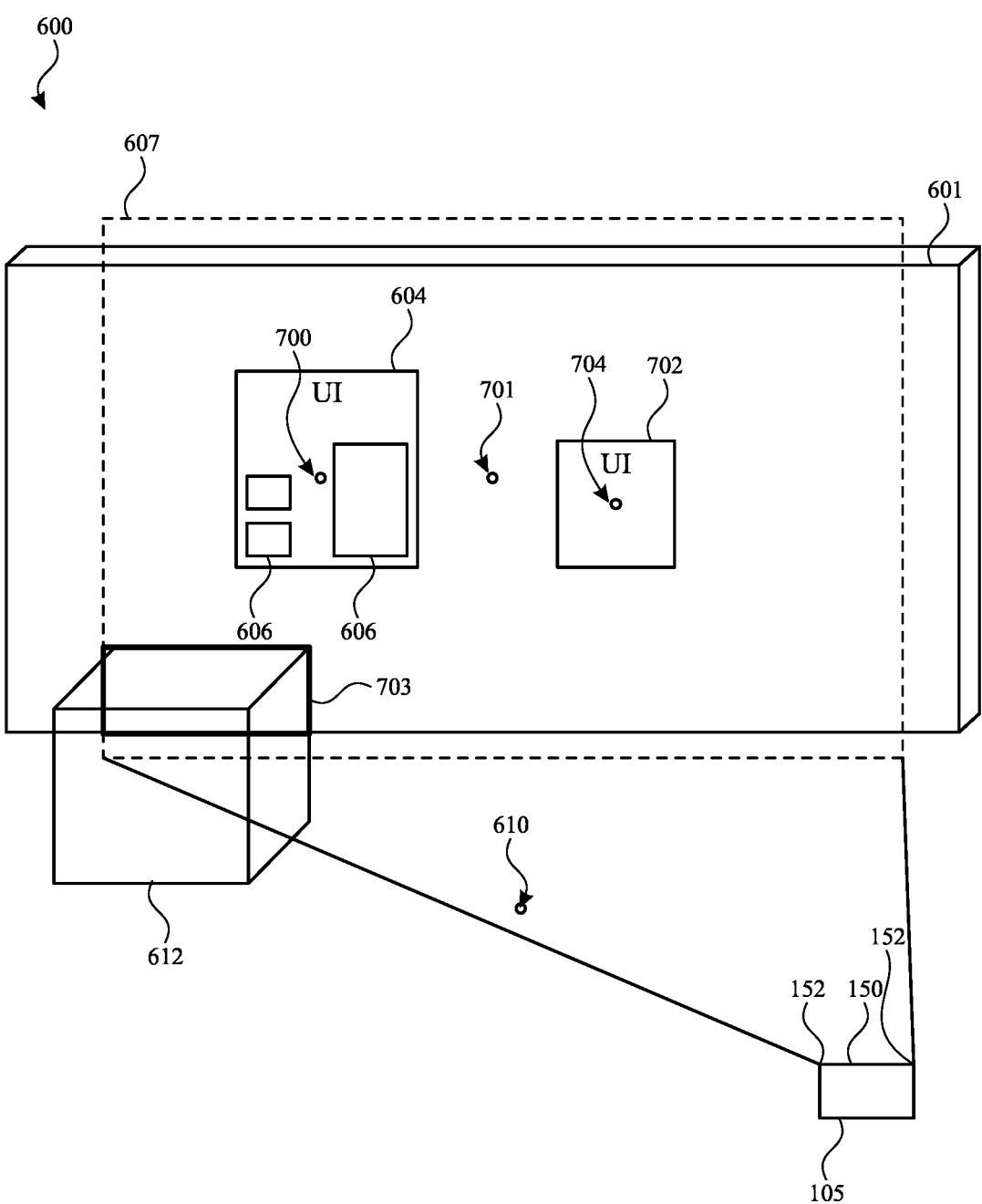
FIG. 7 illustrates an example of virtual content anchored to placement locations associated with an implicit anchor in accordance with aspects of the subject technology.

For example, in FIG. 7, another UI window 702 is displayed at an anchor location 704 on the physical wall 601. The placement system 302 may determine (e.g., based on placement parameters and/or other placement context information from the host systems 300) that the portion of the physical wall 601 that is unoccupied by the UI window 702 and the portion 703 of the physical table 612 that overlaps the physical wall 601 is available for placement of the UI window 604. The placement system 302 may identify the placement location 700 within the unoccupied portion of the physical wall 601. In one or more implementations, identifying the placement location 700 within the unoccupied portion of the physical wall 601 may be based on a desired size of the UI window 604, and/or one or more additional placement parameters such as a preference to be displayed to the left of UI window 702, a preference to be displayed at or near a height of the user's head, a preference to be oriented toward the user's position and/or gaze, and/or other placement parameters. Once the placement location 700 is determined by the placement system 302 and provided to the anchoring system 304, the anchoring system 304 can generate the anchor for anchoring the UI window 604 to the placement location.

In the examples of FIGS. 6 and 7, virtual content in the form of a UI window is displayed by the electronic device 105 anchored to a vertical plane (e.g., the physical wall 601). However, in other use cases, other virtual content may be displayed, which can be anchored to other physical surfaces and/or other physical or virtual locations (e.g., floating locations that are separate from physical objects in the physical environment 600 and that can be fixed relative to the physical environment, and/or that can be anchored to appear at static location in a device-centric coordinate system). For example, in one more implementations, the placement system 302 and/or the anchoring system 304 may compute a virtual system anchor position that can be used to anchor application content. For example, a virtual system anchor position can be generated to anchor application content, such as a tool pallet or other content that may be used at various locations in an XR environment, to a body-follow position that updates (e.g., to move with movements of the body of the user and/or the motion of the electronic device) per-frame (e.g., per display frame of a display and/or per position/orientation measurement frame).

Figure 8:
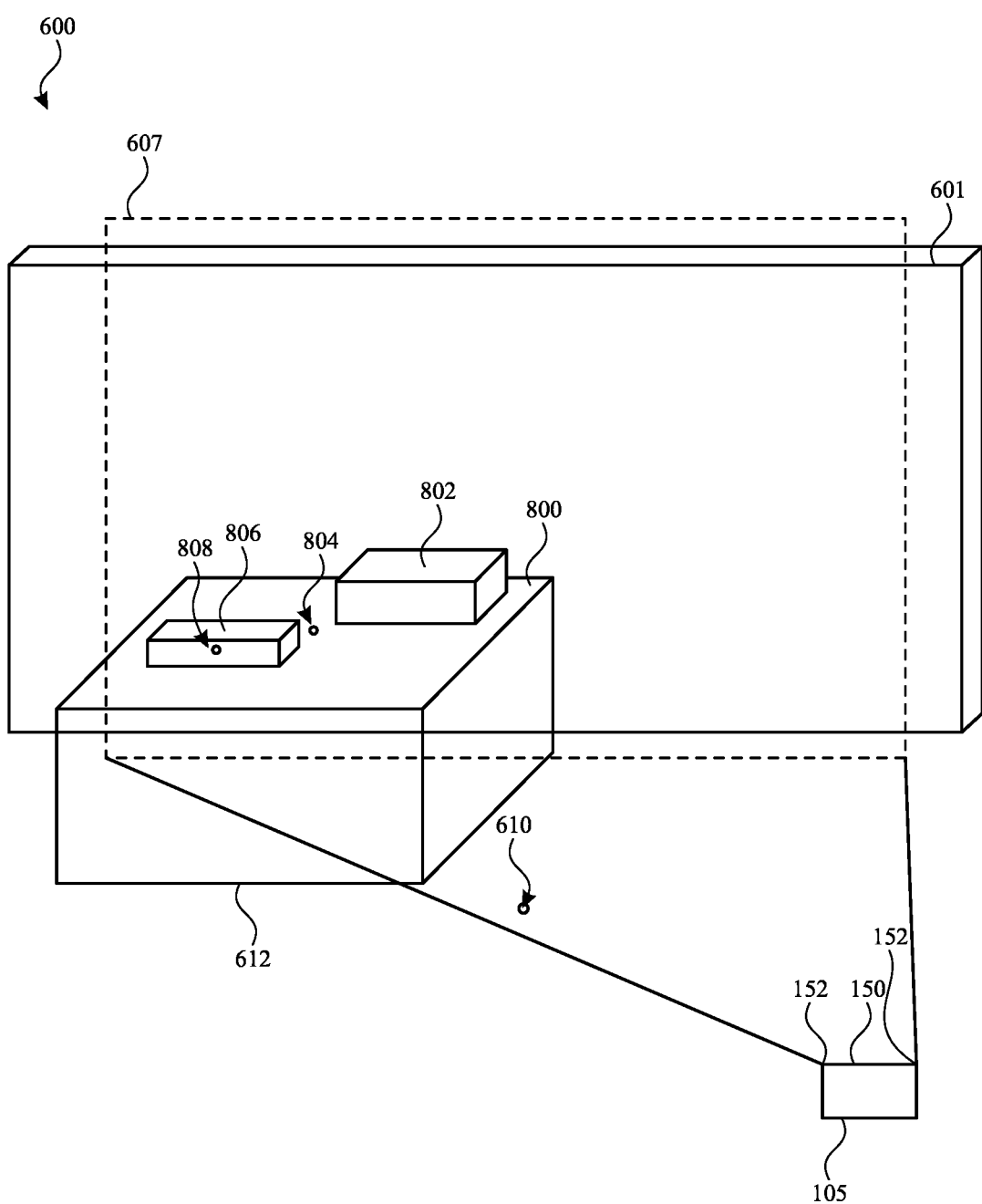
FIG. 8 illustrates another example of virtual content anchored to placement locations associated with an implicit anchor in accordance with aspects of the subject technology.

FIG. 8 illustrates an example use case in which virtual object 806 is displayed on a horizontal plane corresponding to an unoccupied portion of the surface of the physical table 612. For example, an application (e.g., application 202) may request an implicit anchor, such as a horizontal surface or a desktop, for anchoring of virtual content such as a virtual object 806. For example, the virtual object 806 may be a virtual game board (e.g., a virtual chess board, a virtual checkers board, or other virtual board game setup), a virtual keyboard, a virtual character (e.g., a virtual animal, person, or fantastical character), or any other virtual object. Responsive to the implicit anchor request, the electronic device 105 (e.g., host systems 300 and/or placement system 302) may identify the surface 800 of the desk 612 as a horizontal plane in the physical environment 600.

In the example of FIG. 8, a physical object 802 (e.g., a lamp, a plant, a computing device, a beverage container, or any other physical object) occupies a portion of the surface 800 of the physical table 612. The electronic device 105 may detect the physical object 802 (e.g., using sensors 152 and/or camera(s) 150) and exclude the location of the physical object 802 from the available portion of the surface 800 for placement of the virtual object 806 (e.g., by providing the placement system 302 with information indicating only the available portion of the surface 800 and/or by providing placement system 302 with an occupancy map of physical objects in the physical environment with which the placement system 302 can derive the available portion).

In one or more implementations, the placement system 302 may identify a placement location 808 within the unoccupied portion of the surface 800. In one or more implementations, identifying the placement location 808 within the unoccupied portion of the surface 800 may be based on a desired size of the virtual object 806, and/or one or more additional placement parameters such as a preference to be displayed along a particular edge of a horizontal plane, at or near the center of a horizontal plane, to the left, right, above, or below another virtual object on a horizontal plane, a preference to be oriented toward the user's position and/or gaze, and/or other placement parameters. Once the placement location 808 is determined by the placement system 302, the anchoring system 304 can generate the anchor for anchoring the virtual object 806 to the placement location 808 (e.g., by combining a transform from an anchor location 804 of the surface 800 to the placement location 808 with a transform between the coordinate origin 610 and the anchor location 804). Once the virtual object 806 is anchored to the placement location 808, if the electronic device 105 and the user of the electronic device 105 is moved and/or reoriented in the physical environment, the virtual object 806 remains stationary at the placement location 808.

Figure 9:
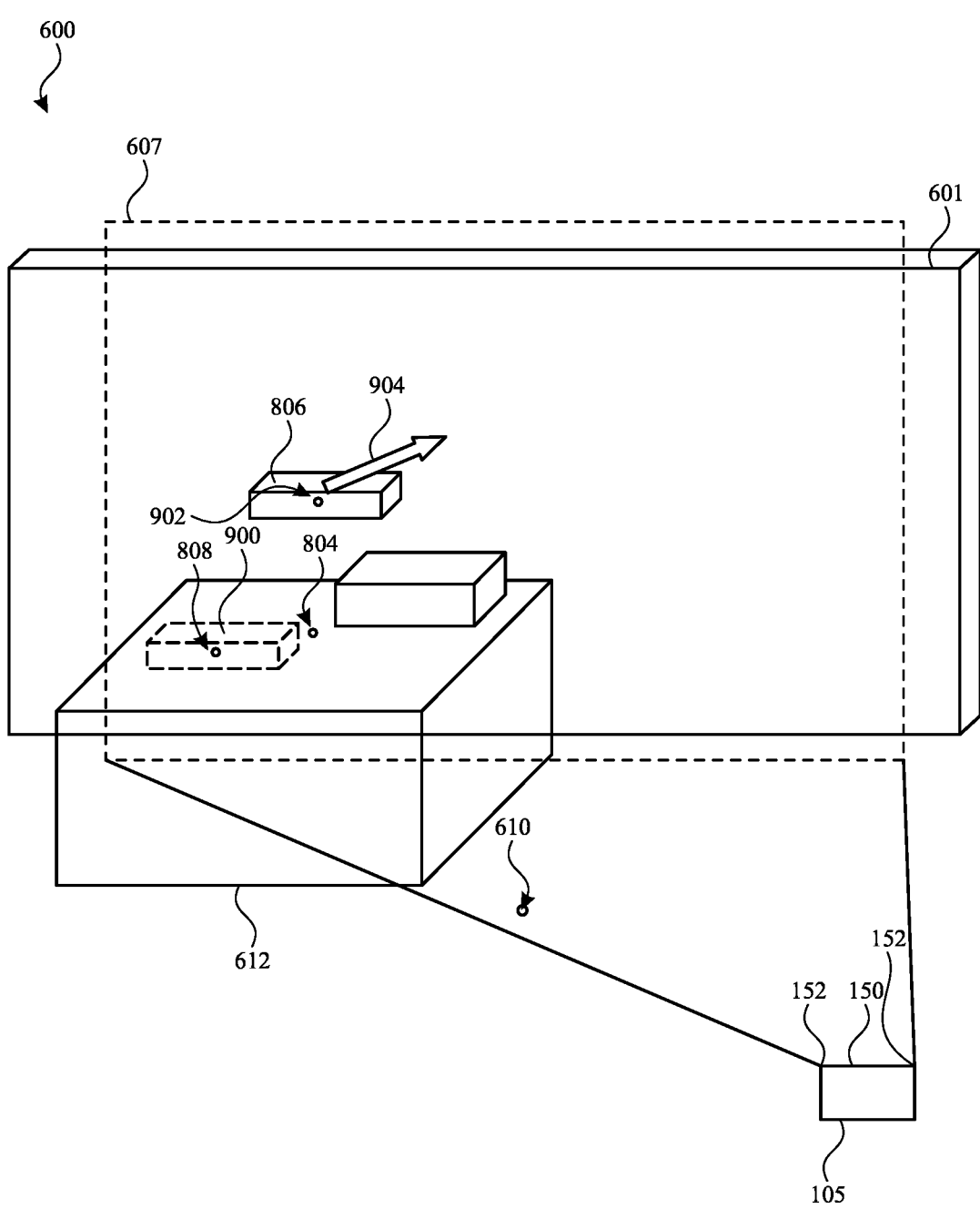
FIG. 9 illustrates an example of virtual content being moved in an XR environment in accordance with aspects of the subject technology.
Figure 10:
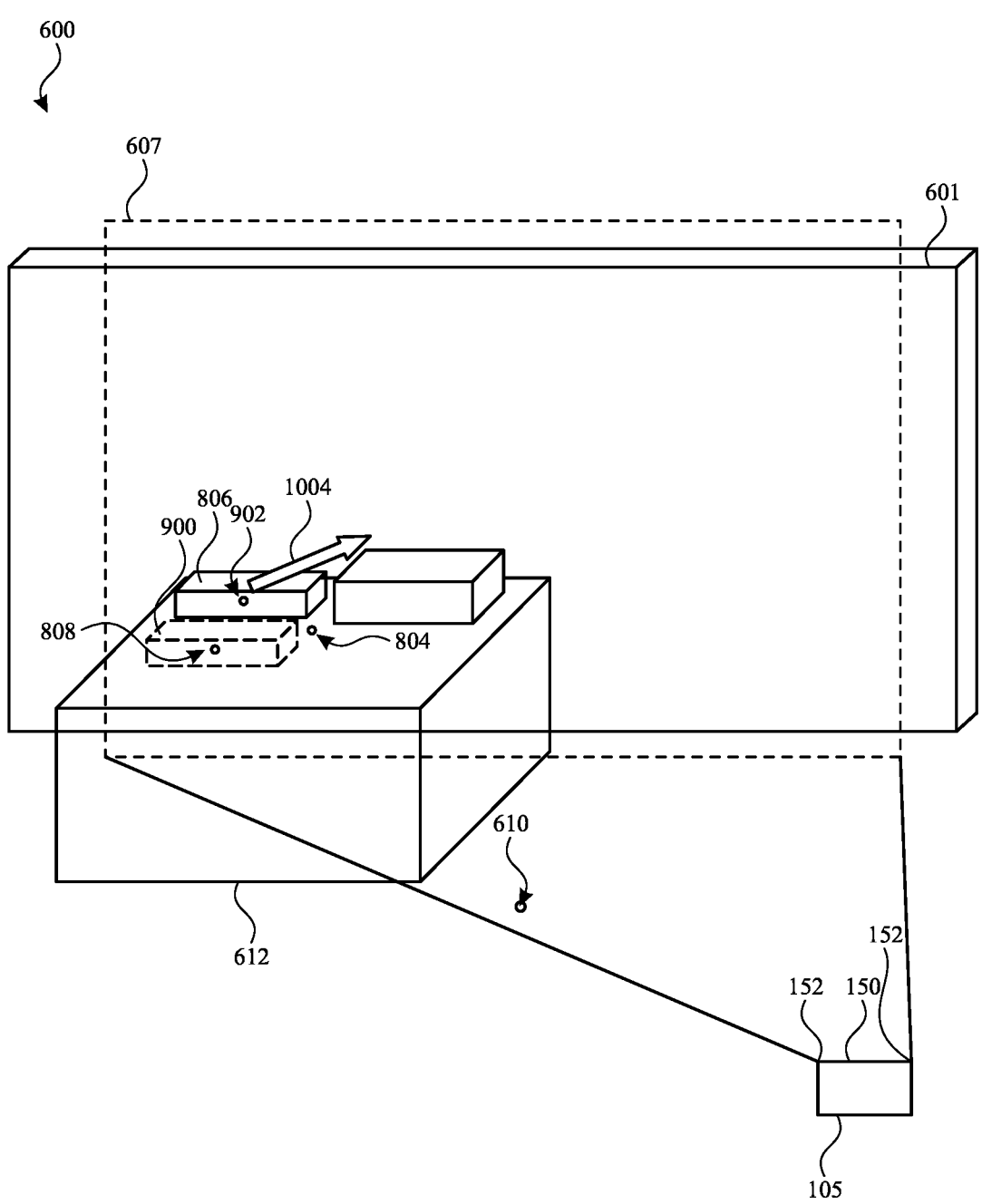
FIG. 10 illustrates another example of virtual content being moved in an XR environment in accordance with aspects of the subject technology.

FIGS. 9 and 10 illustrate how the OS service 200 (e.g., placement system 302, anchoring system 304, and the other host systems 300) can be used to place and anchor virtual content in an XR environment, when there is more than one possible location at which the virtual content can be placed. In addition to the initial placement of virtual content, the OS service 200 (e.g., placement system 302, anchoring system 304, and the other host systems 300) can also facilitate intuitive adjustments, modifications, and/or movements of virtual content by a user of the electronic device 105.

For example, FIG. 9 illustrates a use case in which a user is moving the virtual object 806 from its initial placement location 808. For example, the electronic device 105 may detect (e.g., using sensors 152 and/or camera(s) 150) a gesture such as a pinch or a grab gesture by the user's hand that indicates that the user has selected (e.g., picked up) the virtual object 806. Responsive to detecting the gesture, the placement system 302 may indicate to the anchoring system 304 to anchor the virtual content to a proxy anchor location 902 (e.g., a location corresponding to the location of a proxy anchor such as the user's hand). Once the virtual object 806 has been anchored to the proxy anchor location 902, the virtual object 806 is moved within the viewable area 607 along with the movement of the corresponding proxy anchor (e.g., the user's hand). In various use cases, the user can move the virtual object 806 to any other location in the XR environment, and drop (e.g., by releasing the pinch or grasp gesture), push, throw, or otherwise release the virtual object 806 for anchoring at that new location. In cases in which the user drops the virtual object 806 at a specific location, the anchoring system 304 may generate a new anchor for the virtual object 806 at that location. In cases in which the users pushes or throws the virtual object 806 toward a particular location, the push or throw may be treated as an implicit anchor request, and the placement system 302 may determine a placement location at which the anchoring system 304 is to anchor the virtual object 806.

As shown in FIG. 9, while the virtual object 806 is anchored to the proxy anchor location 902 and being moved, the placement system 302 may store a workspace 900 (e.g., corresponding to the workspace 500 of FIG. 5) for the virtual object 806, at the placement location 808 from which the virtual object 806 was moved. For example, the workspace 900 may be stored by the placement system 302 during a portion of the movement of the virtual content, such as until the virtual object 806 is moved beyond a threshold distance from the placement location 808. In a case in which the user releases the virtual object 806 while the virtual object 806 is within the threshold distance, because the placement system 302 stores the workspace 900, the virtual object 806 may be displayed to snap back to the placement location 808. In cases in which the virtual object 806 is moved beyond the threshold distance from the placement location 808, the virtual object 806 may be de-anchored from the placement location 808 (e.g., and the workspace 900 may be deleted), and a new anchor location for the virtual object can be generated when the movement of the virtual object is completed.

In various examples, the threshold distance from the placement location 808 can be a horizontal distance in the plane of the viewable area 607, a vertical distance in the plane of the viewable area 607, an angular distance around a location corresponding to the user's location, a depth distance perpendicular to the plane of the display area 607, and/or a combination of these distances. Because the user's hand (or another user gesture control action) may be able to traverse the entire horizontal, vertical, and/or angular span of the viewable area 607, but may be only able to extend a limited distance from the user (e.g., to the length of the user's arm), motions of the virtual object 806 in the depth direction (e.g., a direction into or out of the display area 607, away from or toward the user, respectively), may be exaggerated relative to the movement of the user's hand (or other user gesture control action). In this way, the user can be provided with the ability to push the virtual object 806 far into the distance, and/or retrieve or pull the virtual object 806 toward the user from an apparently distant location. For example, in FIG. 9 the virtual object 806 is being moved vertically and horizontally away from the surface 800, as indicated by arrow 904. In the example of FIG. 10, the virtual object 806 is being moved away from the user into the viewable area 607, as indicated by the arrow 1004. As indicated in FIG. 10, the placement system 302 may store the workspace 900 during a portion of the movement of the virtual object 806 in the depth direction. However, in one or more implementations, to account for the exaggerated movement of the virtual content relative to the movement of the user's hand (or other user gesture control action) in the depth direction, the threshold distance in the depth direction may be different (e.g., smaller, if the distance is determined by the motion of the user's hand or other gesture control action) than the threshold distance in the angular, horizontal, and/or vertical direction.

In the examples of FIGS. 9 and 10, the location of the virtual object 806 is adjusted due to direct interaction with the virtual object 806 by the user. It is also appreciated that the OS service 200 (e.g., placement system 302, anchoring system 304, and the other host systems 300) can also facilitate adjustments, modifications, and/or other movements of virtual content in coordination with the placement and/or movement of other virtual or physical objects. For example, FIG. 11 illustrates a use case in which, after placement of the virtual object 806 at the placement location 808, an additional virtual object 1100 is being placed on the surface 800 at a location that would partially overlap with the virtual object 806.

In this example, the additional virtual object 1100 is being moved (e.g., based on a user gesture) in direction 1102 toward the surface 800 into a position partially overlapping with and to the right of the virtual object 806. However, in other use cases, the additional virtual object 1100 may be placed on the surface 800 by the placement system 302, such as based on an implicit anchor request for placement on a horizontal plane or on the surface 800 and based on placement parameters that indicate a desired placement to the right of the virtual object 806).

Figure 11:
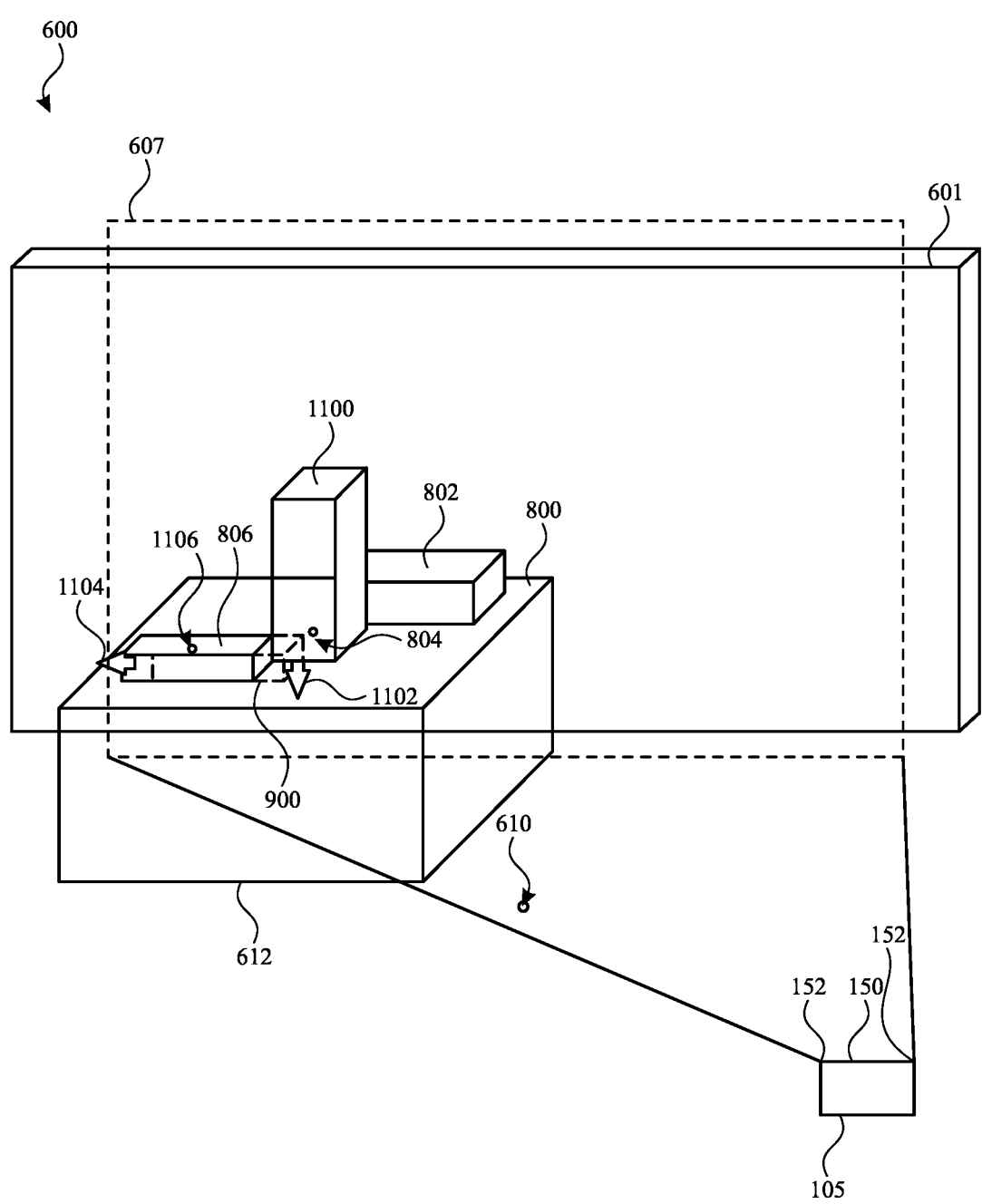
FIG. 11 illustrates an example of updates to anchors for virtual content using a placement system of an electronic device in accordance with aspects of the subject technology.

In the example of FIG. 11, as the additional virtual object 1100 is moved toward the surface 800 in the direction 1102, the placement system 302 may cause the virtual object 806 to move in a direction 1104, to accommodate the additional virtual object 1100. For example, as discussed above in connection with FIG. 5, the placement system 302 may receive updated placement parameters for the virtual object 806 (e.g., placement parameters indicating a preferred placement to the left of the additional virtual object 1100) and may provide an updated placement component to the anchoring system 304 (e.g., indicating a new placement location 1106 to which the virtual object 806 is to be anchored). The anchoring system 304 may then generate the new anchor (e.g., including the transform between coordinate origin 610 and the new placement location 1106). As shown, the placement system 302 may also maintain the workspace 900 during the rearrangement of the additional virtual object 1100 and the virtual object 806 (e.g., for snapping the virtual object 806 back to the placement location 808 if the additional virtual object 1100 is not released on the surface 800).

In one or more implementations, the placement system 302 may store a connection between two or more virtual objects, such as virtual object 806 and additional virtual object 1100 (e.g., after the additional virtual object 1100 has been released or otherwise placed onto the surface 800, and the virtual object 806 has been relocated accordingly). In an implementation in which the placement system stores a connection between two or more virtual objects, the electronic device 105 may provide the user with the ability to move the connected virtual objects together. For example, the electronic device 105 may detect a user gesture indicating a pinch or a grasp of a location between the virtual object 806 and the additional virtual object 1100, and may instruct the anchoring system 304 to generate a proxy anchor for both the virtual object 806 and the additional virtual object 1100 to (e.g., temporarily, until the pinch or grasp gesture is released) anchor the virtual object 806 and the additional virtual object 1100 at respective locations relative to the user's hand. In this way, the virtual object 806 and the additional virtual object 1100 can be moved together within the XR environment, and, if desired, placed at a new placement location with the relative orientation of the virtual object 806 and the additional virtual object 1100 intact. In one or more implementations, during a portion of the joint movement of the virtual object 806 and the additional virtual object 1100, one or more workspaces may be stored so that the virtual object 806 and the additional virtual object 1100 can be snapped back to the prior placement locations for the virtual object 806 and the additional virtual object 1100 if the virtual object 806 and the additional virtual object 1100 are release within a threshold distance of the original placement locations.

Figure 12:
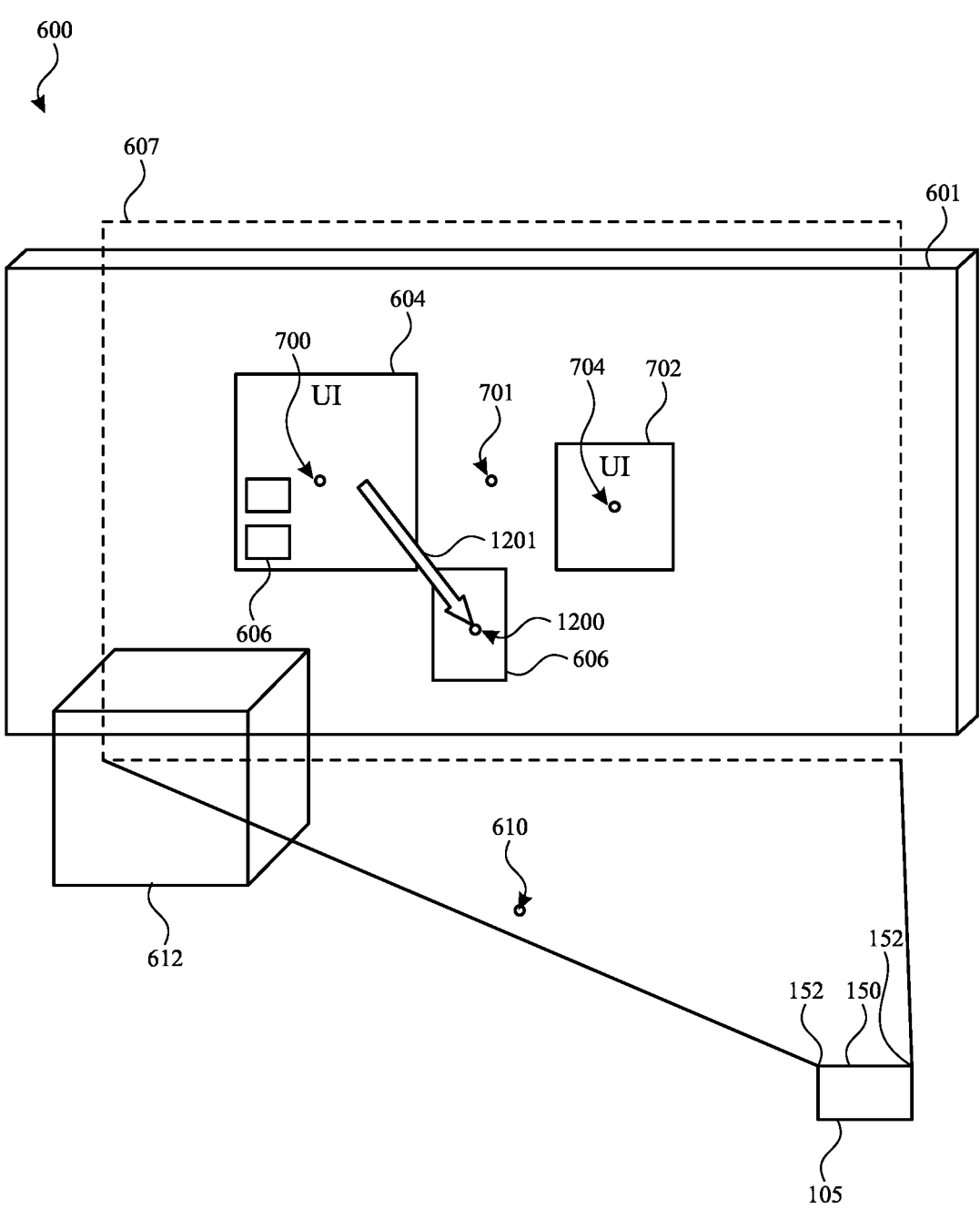
FIG. 12 illustrates an example of a portion of a user-interface window in an XR environment being extracted for standalone display in the XR environment in accordance with aspects of the subject technology.

In the examples of FIGS. 6-11, aspects of placement and/or repositioning of virtual content such as a UI window or another virtual object are described. It is also appreciated that the OS service 200 (e.g., placement system 302, anchoring system 304, and the other host systems 300) can also facilitate placement and/or repositioning of portions of existing (e.g., displayed) virtual content. For example, FIG. 12 illustrates a use case in which an element 606 of UI window 604 is pulled out of, and separated from the UI window 604. For example, the electronic device 105 may detect (e.g., using sensors 152 and/or camera(s) 150) a user gesture indicating a pinch or a grasp of the element 606, and a movement of the user's hand in the direction indicated by arrow 1201. Responsive to detecting the user gesture, the placement system 302 may instruct the anchoring system 304 to generate a proxy anchor for the element 606, to anchor the element 606 to the location of the user's hand (e.g., until the pinch or grasp gesture is released).

In one or more implementations, the placement system 302 may store a sub-workspace within the displayed location of the UI window 604 so that the element 606 can be snapped back to its original position within the UI window 604 if the user gesture is released within a threshold distance of the original location of the element 606 in the UI window 604. In one or more implementations, if the user gesture is released at a location beyond the threshold distance, the placement system 302 and the anchoring system 304 may generate a new anchor for the element 606, such as at a new placement location 1200 determined by the placement system 302. In one or more use cases, the new placement location 1200 may be specified explicitly by the user (e.g., by releasing the pinch or grasp gesture at the new placement location 1200) and the anchor at the new placement location 1200 can be generated by the anchoring system 304 without involvement of the placement system 302. In other user cases, the placement system 302 may determine the new placement location 1200 based on a virtual occupancy map of the XR environment (e.g., including the locations of the UI window 604 and the UI window 702 and/or other virtual content in the XR environment), based on the available portion of the physical wall 601 or other physical or virtual plane or space, and/or one or more placement preferences for the element 606. In one or more use cases, the placement system 302 may also determine new placement locations for other virtual content such as the UI window 604 and the UI window 702 to accommodate the element 606 at the new placement location 1200 (e.g., as described in connection with the example of FIG. 11 in a case in which the element 606 is moved into an overlapping or otherwise conflicting location with the UI window 604 and/or the UI window 702).

FIG. 13 illustrates a flow diagram of an example process for object placement for extended reality according to aspects of the subject technology. The blocks of process 1300 are described herein as occurring in serial, or linearly. However, multiple blocks of process 1300 may occur in parallel. In addition, the blocks of process 1300 need not be performed in the order shown and/or one or more blocks of process 1300 need not be performed and/or can be replaced by other operations.

In the example of FIG. 13, at block 1302, a system process (e.g., OS service 200) of a device (e.g., electronic device 105) may receive, from an application (e.g., application 202) running on the device, a request for an anchor for anchoring of virtual content (e.g., a UI window such as UI window 604, another virtual object such as virtual object 806, and/or other virtual content) relative to a physical environment (e.g., physical environment 600).

At block 1304, the system process of the device may obtain placement context information corresponding to at least one virtual or physical object other than the virtual content (e.g., another UI window such as UI window 702, another virtual object such as additional virtual object 1100, or a physical characteristic of the physical environment, such as a physical object such as physical object 802). For example, the placement context information may include occupancy information for other virtual content including the at least one virtual object other than the virtual content, and/or an available region in the physical environment (e.g., an unoccupied portion of a surface, a wall, or a plane) that meets one or more criteria (e.g., horizontal, vertical, floor, wall, desk, table) for the requested anchor. In one or more implementations, the system process may determine that the requested anchor is an implicit anchor (e.g., an anchor corresponding to a region including various locations at which the virtual content can be placed and/or anchored) and may obtain the placement context information responsive to the determination that the requested anchor is the implicit anchor. In one or more implementations, the system process may also receive an additional request from the application (or another application) for an explicit anchor (e.g., an anchor corresponding to a single location such as a user-specified location and/or to a compact physical object such as the user's hand) for additional virtual content. The system process may generate, responsive to the additional request, an additional anchor and a corresponding additional identifier, without determining an additional placement location.

At block 1306, the system process may determine a placement location (e.g., a placement location 700, a placement location 808, a placement location 1106, a placement location 1200) for the virtual content based on the requested anchor and the placement context information.

At block 1308, the system process may generate the anchor using the placement location. For example, generating the anchor may include generating an anchor identifier for the anchor, and generating a transform between a coordinate origin defined by the device in the physical environment, and the placement location.

At block 1310, the system process may provide an identifier of the anchor to the application. In one or more implementations, the system process may include a first system process (e.g., anchoring system 304) and second system process (e.g., placement system 302). In one or more implementations, the device may generate, by the first system process, a first transform between a coordinate origin (e.g., coordinate origin 610) and a physical anchor location (e.g., anchor location 701 or anchor location 804 as described herein). The device may generate, by the second system process, a second transform between the physical anchor location and the placement location. The device may provide the second transform from the second system process to the first system process. In one or more implementations, generating the anchor at block 1308 may include generating, by the first system process, a third transform between the coordinate origin and the placement location by combining the first transform and the second transform.

At block 1312, the device may display the virtual content at an anchor location corresponding to the anchor (e.g., at the placement location for which the anchor was generated). For example, the application may request that the virtual content be rendered at the placement location corresponding to the anchor, by providing the virtual content and the identifier of the anchor to the system process or to a rendering system (e.g., rendering engine 223) at the device. In one or more implementations, after displaying the virtual content anchored to the anchor location, the device may receive a request to move the virtual content (e.g., as described above in connection with FIGS. 9, 10, and/or 12). For example, the request to move the virtual content may include a pinch or grasp gesture indicating that user has picked up or grabbed the virtual content, and a movement of the user's hand while holding the pinch or grasp gesture. The device may generate, responsive to the request to move the virtual content, a proxy anchor (e.g., a proxy anchor corresponding to the user's hand) for the virtual content, the proxy anchor corresponding to a physical object in the physical environment. The device may track movement of the proxy anchor, and move the displayed virtual content according to the movement of the proxy anchor.

In one or more implementations, the device may maintain the anchor location for the virtual content (e.g., by storing a workspace such as the workspace 900 of FIG. 9) during a first portion of the moving of the displayed virtual content, the first portion within a threshold distance of the anchor location. In one or more implementations, the device may receive, during the first portion of the moving, a request to de-anchor the virtual content from the proxy anchor. For example, the request to de-anchor the virtual content from the proxy anchor may include a release of a pinch or grasp gesture by the user. The device may snap the virtual content back to the anchor location responsive to the request to de-anchor the virtual content from the proxy anchor.

In one or more implementations, the device may de-anchor the virtual content from the anchor location based on a determination that the moving of the virtual content has reached the threshold distance from the anchor location. In one or more implementations, the device may also obtain additional placement context information during the moving of the virtual content. The device may also generate a new anchor for the virtual content based on the additional placement context information. For example, in the example of FIG. 11 discussed above, the electronic device 105 may generate a new anchor for the additional virtual object 1100 of FIG. 11 once the additional virtual object 1100 is released or otherwise placed on the surface 800 of the physical table 612. In one or more implementations, the device may also generate a further new anchor for additional virtual content previously displayed at a further anchor location based on the additional placement context information and the movement of the virtual content. For example, referring again to the example of FIG. 11 discussed above, the electronic device 105 may generate the further new anchor at the placement location 1106 for the virtual object 806 once the additional virtual object 1100 is released or otherwise placed on the surface 800 of the physical table 612.

In one or more implementations, the virtual content may include a user-interface window of an application. The device may receive a request to remove a portion of the virtual content from the user-interface window, and generate a new anchor location for the portion of the virtual content (e.g., as described above in connection with FIG. 12).

In one or more implementations, a device such as the electronic device 105 may be configured to regenerate an XR environment that is displayed prior to a power down event for the device, after a power up event following the power down event. In this way, the device can be allowed to enter a sleep state, a hibernation state, another low power state, or a full power off state, and still allow the user to continue from the last displayed XR environment upon returning the device to the full power state. For example, in one or more implementations, the device may store the anchor for the virtual content prior to and during a power down event for the device (e.g., by writing anchor information, placement information, workspace information, and/or other information describing the state of the virtual content to permanent storage prior to the power down event). The device may, upon power up of the device following the power down event, detect at least a portion of the physical environment (e.g., the same physical environment in which the XR environment was previously displayed), obtain the stored anchor (e.g., from the permanent storage and responsive to determining that at least the portion of the same physical environment has been detected), and re-display the virtual content at the anchor location corresponding to the anchor. In one or more implementations, if a new physical environment is detected upon power up of the device, the device may determine new placement locations for any or all previously displayed virtual content using aspects of the operations and/or components described herein.

As described above, aspects of the subject technology may include the collection of data. The present disclosure contemplates that in some instances, this collected data may include personal information data that uniquely identifies or can be used to identify a specific person. Such personal information data can include demographic data, location-based data, online identifiers, telephone numbers, email addresses, home addresses data, image data, audio data, environment data, or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for object placement for extended reality. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/ sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of object placement for extended reality, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 14:
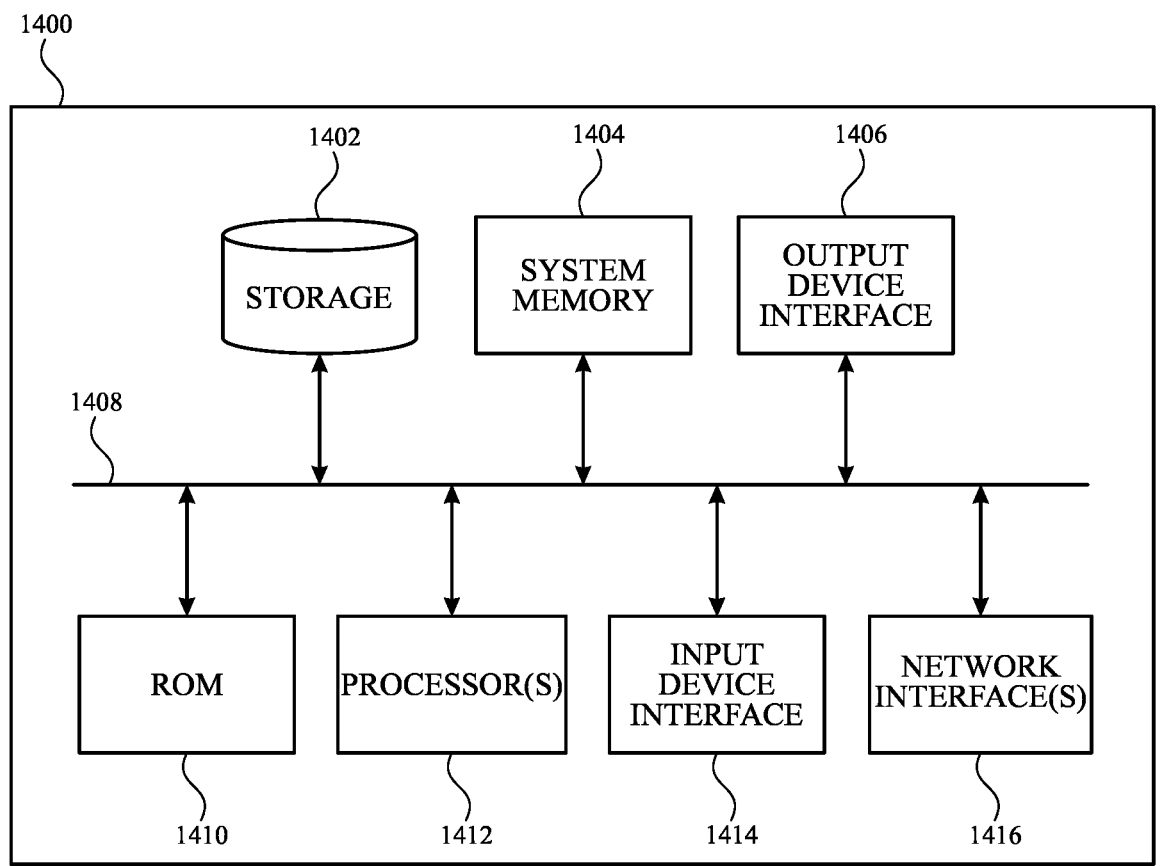
FIG. 14 illustrates an example computing device with which aspects of the subject technology may be implemented.

FIG. 14 illustrates an example computing device with which aspects of the subject technology may be implemented in accordance with one or more implementations. The computing device 1400 can be, and/or can be a part of, any computing device or server for generating the features and processes described above, including but not limited to a laptop computer, a smartphone, a tablet device, a wearable device such as a goggles or glasses, and the like. The computing device 1400 may include various types of computer readable media and interfaces for various other types of computer readable media. The computing device 1400 includes a permanent storage device 1402, a system memory 1404 (and/or buffer), an input device interface 1406, an output device interface 1408, a bus 1410, a ROM 1412, one or more processing unit(s) 1414, one or more network interface(s) 1416, and/or subsets and variations thereof.

The bus 1410 collectively represents all system, peripheral, and chipset buses that communicatively connect the numerous internal devices of the computing device 1400. In one or more implementations, the bus 1410 communicatively connects the one or more processing unit(s) 1414 with the ROM 1412, the system memory 1404, and the permanent storage device 1402. From these various memory units, the one or more processing unit(s) 1414 retrieves instructions to execute and data to process in order to execute the processes of the subject disclosure. The one or more processing unit(s) 1414 can be a single processor or a multi-core processor in different implementations.

The ROM 1412 stores static data and instructions that are needed by the one or more processing unit(s) 1414 and other modules of the computing device 1400. The permanent storage device 1402, on the other hand, may be a read-and-write memory device. The permanent storage device 1402 may be a non-volatile memory unit that stores instructions and data even when the computing device 1400 is off. In one or more implementations, a mass-storage device (such as a magnetic or optical disk and its corresponding disk drive) may be used as the permanent storage device 1402.

In one or more implementations, a removable storage device (such as a floppy disk, flash drive, and its corresponding disk drive) may be used as the permanent storage device 1402. Like the permanent storage device 1402, the system memory 1404 may be a read-and-write memory device. However, unlike the permanent storage device 1402, the system memory 1404 may be a volatile read-and-write memory, such as random access memory. The system memory 1404 may store any of the instructions and data that one or more processing unit(s) 1414 may need at runtime. In one or more implementations, the processes of the subject disclosure are stored in the system memory 1404, the permanent storage device 1402, and/or the ROM 1412. From these various memory units, the one or more processing unit(s) 1414 retrieves instructions to execute and data to process in order to execute the processes of one or more implementations.

The bus 1410 also connects to the input and output device interfaces 1406 and 1408. The input device interface 1406 enables a user to communicate information and select commands to the computing device 1400. Input devices that may be used with the input device interface 1406 may include, for example, alphanumeric keyboards and pointing devices (also called "cursor control devices"). The output device interface 1408 may enable, for example, the display of images generated by computing device 1400. Output devices that may be used with the output device interface 1408 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 14, the bus 1410 also couples the computing device 1400 to one or more networks and/or to one or more network nodes through the one or more network interface(s) 1416. In this manner, the computing device 1400 can be a part of a network of computers (such as a LAN, a wide area network ("WAN"), or an Intranet, or a network of networks, such as the Internet. Any or all components of the computing device 1400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, race-track memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A computer-implemented method, comprising:
using at least one processor executing stored program instructions:
receiving, at an operating system (OS) process of a device from an application running on the device, a request for an anchor for anchoring of virtual content relative to a physical environment, wherein the request indicates at least a region for the requested anchor and the OS process is separate from the application;
determining, by the OS process, whether the requested anchor is an implicit anchor type or an explicit anchor type;
in response to determining, by the OS process, that the requested anchor is the implicit anchor type:
obtaining, by the OS process of the device, placement context information corresponding to at least one virtual or physical object other than the virtual content;

determining, by the OS process, a placement location for the virtual content within the region based on the requested anchor and the placement context information; and
generating the requested anchor by the OS process using the placement location;
in response to determining, by the OS process, that the requested anchor is the explicit anchor type:
obtaining, by the OS process of the device, an anchor location from the request for the anchor; and
generating the requested anchor by the OS process using the anchor location;
providing an identifier of the requested anchor from the OS process to the application;
receiving, by the OS process of the device, rendering application data from the application for displaying the virtual content corresponding to the identifier of the requested anchor; and
displaying, by the OS process, the virtual content at the anchor location corresponding to the requested anchor.

2. The computer-implemented method of claim 1, wherein when the requested anchor is the implicit anchor type, the placement context information comprises occupancy information for other virtual content including at least one virtual object other than the virtual content.

3. The computer-implemented method of claim 2, wherein the placement context information further comprises an available region in the physical environment that meets one or more criteria for the requested anchor.

4. The computer-implemented method of claim 1, wherein the OS process comprises a first OS process and second OS process, and wherein in response to determining, by the OS process, that the requested anchor is the implicit anchor type further comprises:
generating, by the first OS process, a first transform between a coordinate origin and a physical anchor location;
generating, by the second OS process, a second transform between the physical anchor location and the placement location; and
providing the second transform from the second OS process to the first OS process,
wherein generating the requested anchor comprises generating, by the first OS process, a third transform between the coordinate origin and the placement location by combining the first transform and the second transform.

5. The computer-implemented method of claim 1, further comprising:
receiving, by the OS process, an additional request from the application for an additional explicit anchor for additional virtual content; and
generating, by the OS process and responsive to the additional request, an additional anchor and a corresponding additional identifier, without determining an additional placement location.

6. The computer-implemented method of claim 1, further comprising, after displaying the virtual content anchored to the anchor location:
receiving, by the device, a request to move the virtual content;
generating, responsive to the request to move the virtual content, a proxy anchor for the virtual content, the proxy anchor corresponding to a physical object in the physical environment;
tracking movement of the proxy anchor; and moving the displayed virtual content according to the movement of the proxy anchor.

7. The computer-implemented method of claim 6, further comprising:

maintaining the anchor location for the virtual content during a first portion of the moving of the displayed virtual content, the first portion within a threshold distance of the anchor location.

8. The computer-implemented method of claim 7, further comprising:

receiving, by the device during the first portion of the moving, a request to de-anchor the virtual content from the proxy anchor; and snapping the virtual content back to the anchor location responsive to the request to de-anchor the virtual content from the proxy anchor.

9. The computer-implemented method of claim 7, further comprising de-anchoring the virtual content from the anchor location based on a determination that the moving of the virtual content has reached the threshold distance from the anchor location.

10. The computer-implemented method of claim 9, further comprising:

obtaining additional placement context information during the moving of the virtual content;

generating a new anchor for the virtual content based on the additional placement context information; and generating a further new anchor for additional virtual content previously displayed at a further anchor location based on the additional placement context information and the movement of the virtual content.

11. The computer-implemented method of claim 1, wherein the virtual content comprises a user-interface window of an application, further comprising receiving, by the OS process of the device, rendering application data from the application running on the device for displaying the virtual content at an anchor location corresponding to the identifier of the requested anchor.

12. The computer-implemented method of claim 11, further comprising:

receiving, by the device, a request to remove a portion of the virtual content from the user-interface window; and generating a new anchor location for the portion of the virtual content.

13. The computer-implemented method of claim 1, further comprising:

storing the requested anchor for the virtual content prior to, and during, a power down event for the device;

upon power up of the device following the power down event:

detecting at least a portion of the physical environment;

obtaining the stored anchor; and re-displaying the virtual content at the anchor location corresponding to the requested anchor.

14. The computer-implemented method of claim 1, wherein when the requested anchor is the implicit anchor type, determining the placement location comprises:

obtaining an anchor location of a physical anchor object or a virtual anchor object that corresponds to the requested anchor;

determining the placement location to be different than the anchor location of the physical anchor object or the virtual anchor object; and determining a relative transform between the placement location and the anchor location of the physical anchor object or the virtual anchor object.

15. The computer-implemented method of claim 14, wherein the physical anchor object comprises at least one of a floor, a wall, a desk, or a table.

16. The computer-implemented method of claim 14, wherein the virtual anchor object comprises at least one of a floating vertical plane or a floating horizontal plane.

17. A device, comprising:

a processor; and a memory containing instructions that, when executed by the processor, cause the processor to:

receive, at an operating system (OS) process of the device from an application running on the device, a request for an anchor for anchoring of virtual content relative to a physical environment, wherein the request indicates at least a region for the requested anchor and the OS process is separate from the application;

determine, by the OS process, whether the requested anchor is an implicit anchor type or an explicit anchor type;

in response to a determination, by the OS process, that the requested anchor is the implicit anchor type:

obtain, by the OS process of the device, placement context information corresponding to at least one virtual or physical object other than the virtual content;

determine, by the OS process, a placement location for the virtual content based on the requested anchor and the placement context information; and generate the requested anchor by the OS process using the placement location;

in response to another determination, by the OS process, that the requested anchor is the explicit anchor type:

obtain, by the OS process of the device, an anchor location from the request for the anchor; and generate the requested anchor by the OS process using the anchor location;

provide an identifier of the requested anchor from the OS process to the application;

receive, by the OS process of the device, rendering application data from the application for displaying the virtual content corresponding to the identifier of the requested anchor; and provide, by the OS process, the virtual content for display at the anchor location corresponding to the requested anchor.

18. The device of claim 17, wherein the placement context information comprises occupancy information for other virtual content including at least one virtual object other than the virtual content, and an available region in the physical environment that meets one or more criteria for the requested anchor.

19. A non-transitory computer-readable medium storing instructions which, when executed by one or more processors, cause the one or more processors to perform operations including:

receiving, at an operating system (OS) process of a device from an application running on the device, a request for an anchor for anchoring of virtual content relative to a physical environment, wherein the request indicates at least a region for the requested anchor and the OS process is separate from the application;

determining, by the OS process, whether the requested anchor is an implicit anchor type or an explicit anchor type;

in response to determining, by the OS process, that the requested anchor is the implicit anchor type;

obtaining, by the OS process of the device, placement context information corresponding to at least one virtual or physical object other than the virtual content;

determining, by the OS process, a placement location for the virtual content based on the requested anchor and the placement context information;

generating the requested anchor by the OS process using the placement location;

in response to determining, by the OS process, that the requested anchor is the explicit anchor type:

obtaining, by the OS process of the device, an anchor location from the request for the anchor; and generating the requested anchor by the OS process using the anchor location;

providing an identifier of the requested anchor from the OS process to the application;

receiving, by the OS process of the device, rendering application data from the application for displaying the virtual content corresponding to the identifier of the requested anchor; and displaying, by the OS process, the virtual content at the anchor location corresponding to the requested anchor.

* * * * *